(12) United States Patent
Chandra et al.

(10) Patent No.: US 7,823,102 B2
(45) Date of Patent: Oct. 26, 2010

(54) THERMALLY AWARE DESIGN MODIFICATION

(75) Inventors: Rajit Chandra, Cupertino, CA (US);
Adi Srinivasan, Fremont, CA (US);
Nanda Gopal, Saratoga, CA (US)

(73) Assignee: Gradient Design Automation Inc.,
Santa Clara, CA (US)

( * ) Notice: Subject to any disclaimer, the term of this patent is extended or adjusted under 35 U.S.C. 154(b) by 358 days.

(21) Appl. No.: 12/140,188

(22) Filed: Jun. 16, 2008

(65) Prior Publication Data
US 2009/0019411 A1    Jan. 15, 2009

Related U.S. Application Data

(63) Continuation of application No. PCT/US2006/062184, filed on Dec. 15, 2006, which is a continuation of application No. 11/317,664, filed on Dec. 23, 2005, now abandoned, and a continuation of application No. 11/317,670, filed on Dec. 23, 2005, now abandoned, and a continuation of application No. 11/317,668, filed on Dec. 23, 2005, now Pat. No. 7,472,363.

(60) Provisional application No. 60/744,405, filed on Apr. 6, 2006, provisional application No. 60/751,376, filed on Dec. 17, 2005.

(51) Int. Cl.
*G06F 17/50* (2006.01)
(52) U.S. Cl. ............................................. 716/4; 716/2
(58) Field of Classification Search ................ 716/2, 716/4
See application file for complete search history.

(56) References Cited

U.S. PATENT DOCUMENTS 4,696,578 A    9/1987    Mansuria et al.
5,654,904 A    8/1997    Thakur
(Continued)

FOREIGN PATENT DOCUMENTS

WO    2007/019531 A2    2/2007
(Continued)

OTHER PUBLICATIONS

Ting-Yuan Wang et al., 3D Thermal-ADI—An Efficient Chip-Level Transient Thermal Simulator, ISPD'03, Apr. 6-9, 2003, Monterey, California, 8 pages.
(Continued)

*Primary Examiner*—Stacy A Whitmore
(74) *Attorney, Agent, or Firm*—PatentVentures; Bennett Smith; Korbin Van Dyke

(57) ABSTRACT

In a first variation, a thermally aware design automation suite integrates system-level thermal awareness into design of semiconductor chips, performing fine-grain thermal simulations of the chips based on thermal models and boundary conditions. The suite uses results of the simulations to modify thermally significant structures to achieve desired thermal variations across a chip, meet design assertions on selected portions of the chip, and verify overall performance and reliability of the chip over designated operating ranges and manufacturing variations. In a second variation, a discretization approach models chip temperature distributions using heuristics to adaptively grid space in three dimensions. Adaptive and locally variable grid spacing techniques are used to efficiently and accurately converge for steady state and/or transient temperature solutions. The modeling optionally reads a mesh initialization file specifying selected aspects and parameters associated with controlling use and behavior of the variable grid spacing techniques.

44 Claims, 29 Drawing Sheets

U.S. PATENT DOCUMENTS

| | | | |
|---|---|---|---|
| 5,710,068 | A | 1/1998 | Hill |
| 5,831,249 | A | 11/1998 | Rohner et al. |
| 5,838,578 | A | 11/1998 | Pippin |
| 5,927,853 | A | 7/1999 | Christiaens et al. |
| 5,997,174 | A | 12/1999 | Wyland |
| 6,124,635 | A | 9/2000 | Kuwabara et al. |
| 6,172,337 | B1 | 1/2001 | Johnsgard et al. |
| 6,203,191 | B1 | 3/2001 | Mongan |
| 6,247,161 | B1 | 6/2001 | Lambrecht et al. |
| 6,320,201 | B1 | 11/2001 | Corbett et al. |
| 6,334,013 | B1 | 12/2001 | Laming et al. |
| 6,389,582 | B1 | 5/2002 | Valainis et al. |
| 6,505,326 | B1 | 1/2003 | Farral et al. |
| 6,532,570 | B1 | 3/2003 | Mau |
| 6,591,399 | B1 | 7/2003 | Wyrzykowska et al. |
| 6,591,402 | B1 | 7/2003 | Chandra et al. |
| 6,634,013 | B2 | 10/2003 | Shinzawa |
| 6,662,345 | B2 | 12/2003 | Uchida et al. |
| 6,751,781 | B2 | 6/2004 | Lin et al. |
| 6,769,102 | B2 | 7/2004 | Frank et al. |
| 6,910,812 | B2 | 6/2005 | Pommer et al. |
| 6,931,369 | B1 | 8/2005 | Perry et al. |
| 6,993,742 | B2 | 1/2006 | Fryer et al. |
| 7,025,280 | B2 | 4/2006 | Kaushal et al. |
| 7,039,888 | B2 | 5/2006 | Steinmann et al. |
| 7,096,450 | B2 | 8/2006 | Gill et al. |
| 7,162,402 | B2 | 1/2007 | Daems et al. |
| 7,171,346 | B1 | 1/2007 | Recker et al. |
| 7,191,112 | B2 | 3/2007 | Demler et al. |
| 7,191,413 | B2 | 3/2007 | Chandra et al. |
| 7,194,711 | B2 | 3/2007 | Chandra |
| 7,203,920 | B2 | 4/2007 | Chandra |
| 7,263,477 | B2 | 8/2007 | Chen et al. |
| 7,353,471 | B1 | 4/2008 | Chandra et al. |
| 7,383,520 | B2 | 6/2008 | Chandra |
| 7,401,304 | B2 | 7/2008 | Li et al. |
| 2001/0032330 | A1 | 10/2001 | Kusunoki |
| 2002/0050833 | A1 | 5/2002 | Jones et al. |
| 2003/0145296 | A1 | 7/2003 | Chandra et al. |
| 2003/0226122 | A1 | 12/2003 | Hathaway et al. |
| 2005/0044515 | A1 | 2/2005 | Acar et al. |
| 2005/0058178 | A1 | 3/2005 | Shih et al. |
| 2005/0138581 | A1 | 6/2005 | Usui |
| 2005/0149886 | A1 | 7/2005 | Kaushal et al. |
| 2005/0155004 | A1 | 7/2005 | Miura et al. |
| 2005/0166166 | A1 | 7/2005 | Chandra et al. |
| 2005/0166168 | A1 | 7/2005 | Chandra |
| 2005/0210425 | A1 | 9/2005 | Keller et al. |
| 2006/0031794 | A1 | 2/2006 | Li et al. |
| 2007/0120239 | A1 | 5/2007 | Chandra |
| 2007/0157137 | A1 | 7/2007 | Chandra |

FOREIGN PATENT DOCUMENTS

| | | |
|---|---|---|
| WO | 2007/019531 A3 | 2/2007 |
| WO | 2007/070879 A1 | 6/2007 |

OTHER PUBLICATIONS

Ting-Yuan Wang et al., Thermal-ADI—A Linear-Time Chip-Level Dynamic Thermal-Simulation Algorithm Based on Alternating-Direction-Implicit (ADI) Method, IEEE Transactions on Very Large Scale Integration (VLSI) systems, vol. 11, No. 4, Aug. 2003, pp. 691-700.

Ting-Yuan Wang et al., 3D Thermal-ADI: A Linear-Time Chip Level Transient Thermal Simulator, IEEE Transactions on Computer-Aided Design of Integrated Circuits and Systems, vol. 21, No. 12, Dec. 2002, pp. 1434-1445.

Ting-Yuan Wang et al., Thermal-ADI: A Linear-Time Chip-Level Dynamic Thermal Simulation Algorithm Based on Alternating-Direction-Implicit (ADI) Method, ISPD'01, Apr. 1-4, 2001, Sonoma, California, 6 pages.

"Design Flow", Carleton University, Copyright John Knight, Revised; Sep. 30, 2003, pp. 1-22.

"Stratix II High-Speed Development Board", Data Sheet, Altera Corporation, Sep. 2004, ver.1.0, pp. 1-85.

Szekely V. et al.: "A thermal benchmark chip: design and applications", Part A, IEEE Transactions on Components, Packaging, and Manufacturing Technology, vol. 21, No. 3, Sep. 1998, pp. 399-405.

Hang L. et al.: "Efficient thermal stimulation for run-time temperature tracking and management", Computer Design: VLSI in Computers and Processors, ICCD 2005 Proceedings, IEEE International Conference Oct. 2-5, 2005, 4 pages.

International Search Report and Written Opinion for PCT/US2006/062184; mailed May 7, 2007; 11 pages.

Yonghong Yang et al.; Adaptive Chip-Package Thermal Analysis for Synthesis and Design; Design, Automation and Test in Europe, 2006. Date '06. Proceedings; Mar. 6-10, 2006; 6 pgs.

Yonghong Yang et al.; Adaptive multi-domain thermal modeling and analysis for integrated circuit synthesis and design; Computer-Aided Design, ICCAD '06. IEEE/ACM International Conference, Nov. 2006; pp. 575-582.

Table of Jul. 22, 2009 identifying references used to reject claims in related applications; 1 page.

Kaustav Banerjee et al., High-Current Failure Model for VLSI Interconnects Under Short-Pulse Stress Conditions, IEEE Electron Device Letters, vol. 18, No. 9, Sep. 1997, pp. 405-407.

Kaustav Banerjee et al., The Effect of Interconnect Scaling and Low-k Dielectric on the Thermal Characteristics of the IC Metal, Electron Devices Meeting, 1996, International, Dec. 8-11, 1996, San Francisco, CA, USA, pp. 65-68.

Wei Huang et al., 51.3 Compact Thermal Modeling for Temperature-Aware Design, HPLP and LAVA labs, Departments of ECE and CS, University of Virginia, Jun. 10, 2004, 27 pgs.

Wei Huang et al., Compact Thermal Modeling for Temperature-Aware Design, DAC 2004 Jun. 7-11, 2004, San Diego, California, USA, pp. 878-883.

Amir H. Ajami et al., Analysis of Substrate Thermal Gradient Effects on Optimal Buffer Insertion, Presentation Outline, ICCAD '01, Nov. 5, 2001, 29 slides on 5 pgs.

Amir H. Ajami et al., Analysis of Substrate Thermal Gradient Effects on Optimal Buffer Insertion, ICCAD '01, Proceedings of the 2001 IEEE/ACM international conference on Computer-aided design, Nov. 5, 2001, San Jose, California, pp. 44-48.

Amir H. Ajami et al., Analysis of Non-Uniform Temperature-Dependent Interconnect Performance in High Performance Ics, DAC'01, Jun. 18-22, 2001, Las Vegas, Nevada, USA, 6 pgs.

Kaustav Banerjee et al., Analysis and Optimization of Thermal Issues in High-Performance VLSI, ISPD'01, Apr. 1-4, 2001, Sonoma, California, USA, pp. 230-237.

Kaustav Banerjee et al., Analysis and Optimization of Thermal Issues in High Performance VLSI, Presentation Outline, ISPD 2001, 57 slides on 10 pgs.

Amir H. Ajami et al., Non-Uniform Chip-Temperature Dependent Signal Integrity, Digest of Technical Papers, 2001 Symposium on VLSI Technology, Jun. 12-14, 2001, Kyoto, Japan, 2 pgs.

Amir H. Ajami et al., Effects of Non-uniform Substrate Temperature on the Clock Signal Integrity in High Performance Designs, IEEE Conference on Custom Integrated Circuits, San Diego, CA, USA, May 6-9, 2001, 4 pgs.

Amir H. Ajami et al., Effects of Non-Uniform Substrate Temperature on the Clock Signal Integrity in High Performance Designs, Presentation Outline, CICC'01, May 8, 2001, 26 slides on 5 pgs.

Ting-Yuan Wang et al., Thermal-ADI—A Linear-Time Chip-Level Dynamic Thermal-Simulation Algorithm Based on Alternating-Direction-Implicit (ADI) Method, Poster, University of Wisconsin, 2003, 1 pg.

Ting-Yuan Wang et al., SPICE-Compatible Thermal Simulation with Lumped Circuit Modeling for Thermal Reliability Analysis based on Modeling Order Reduction, Proceedings of the 5th International Symposium on Quality Electronic Design, Mar. 22-24, 2004, 6 pgs.

Rajit Chandra, Impact of Thermal Analysis on Large Chip Design, Outline, Electronic Design Process Symposium Monterey, CA, Apr. 7, 2005, 25 pgs.

Peng Li, Efficient Full-Chip Thermal Modeling and Analysis, Proceedings of the 2004 IEEE/ACM International conference on Computer-aided design, Nov. 7-11, 2004, pp. 319-326.

Vladimir Koval et al., MONSTR: a complete thermal simulator of electronic systems, Proceedings of the 31st annual conference on Design Automation, San Diego, California, Jun. 6-10, 1994, 6 pgs.

Rajit Chandra, A thermal-aware IC design methodology, http://www.eetimes.com/showArticle.jhtml?articleID=164302273&printable=true, Jun. 13, 2005, 7 pgs.

Sheng-Chih Lin and Kaustav Banerjee, "Cool Chips: Opportunities and Implications for Power and Thermal Management", IEEE Transactions on Electron Devices, vol. 55, No. 1, Jan. 2008 pp. 245-255.

International Search Report and Written Opinion for PCT/US2006/030940; mailed Aug. 24, 2007; 4 pages.

The International Technology Roadmap for Semiconductors, 2003 Edition, Executive Summary, published by the Semiconductor Industry Association et al., 2003; 75 pages.

The International Technology Roadmap for Semiconductors, 2003 Edition, System Drivers, published by the Semiconductor Industry Association et al., 2003; 24 pages.

The International Technology Roadmap for Semiconductors, 2003 Edition, Design, published by the Semiconductor Industry Association et al., 2003; 43 pages.

The International Technology Roadmap for Semiconductors, 2003 Edition, Test and Test Equipment, published by the Semiconductor Industry Association et al., 2003; 63 pages.

The International Technology Roadmap for Semiconductors, 2003 Edition, Process Integration, Devices and Structures; Includes RF and Analog/Mixed-Signal Technologies for Wireless Communications and Emerging Research Devices, published by the Semiconductor Industry Association et al., 2003; 41 pages.

The International Technology Roadmap for Semiconductors, 2003 Edition, Radio Frequency and Analog/Mixed-Signal Technologies for Wireless Communications [A Section of the Process Integration Chapter], published by the Semiconductor Industry Association et al., 2003; 40 pages.

The International Technology Roadmap for Semiconductors, 2003 Edition, Emerging Research Devices, published by the Semiconductor Industry Association et al., 2003; 53 pages.

The International Technology Roadmap for Semiconductors, 2003 Edition, Front End Processes, published by the Semiconductor Industry Association et al., 2003; 62 pages.

The International Technology Roadmap for Semiconductors, 2003 Edition, Lithography, published by the Semiconductor Industry Association et al., 2003; 20 pages.

The International Technology Roadmap for Semiconductors, 2003 Edition, Interconnect, published by the Semiconductor Industry Association et al., 2003; 45 pages.

The International Technology Roadmap for Semiconductors, 2003 Edition, Factory Integration, published by the Semiconductor Industry Association et al., 2003; 42 pages.

The International Technology Roadmap for Semiconductors, 2003 Edition, Assembly and Packaging, published by the Semiconductor Industry Association et al., 2003; 24 pages.

The International Technology Roadmap for Semiconductors, 2003 Edition, Environment, Safety, and Health, published by the Semiconductor Industry Association et al., 2003; 27 pages.

The International Technology Roadmap for Semiconductors, 2003 Edition, Yield Enhancement, published by the Semiconductor Industry Association et al., 2003; 39 pages.

The International Technology Roadmap for Semiconductors, 2003 Edition, Metrology, published by the Semiconductor Industry Association et al., 2003; 40 pages.

The International Technology Roadmap for Semiconductors, 2003 Edition, Modeling and Simulation, published by the Semiconductor Industry Association et al., 2003; 27 pages.

Yi-Kan Cheng, Prasun Raha, Chin-Chi Teng, Elyse Rosenbaum, Sung-Mo Kang; Illiads-T: An Electrothermal Timing Simulator for Temperature-Sensitive Reliability Diagnosis of CMOS VLSI Chips; IEEE Transactions on Computer-Aided Design of Integrated Circuits and Systems, vol. 17, No. 8, Aug. 1998, pp. 668-681.

Sven Rzepka, Kaustav Banerjee, Ekkehard Meusel, and Chenming Hu; Characterization of Self-Heating in Advanced VLSI Interconnect Lines Based on Thermal Finite Element Simulation; IEEE Transactions on Components, Packaging, and Manufacturing Technology—Part A, vol. 21, No. 3, Sep. 1998, pp. 406-411.

Yi-Kan Cheng, Ching-Han Tsai, Chin-Chi Teng, Elyse Rosenbaum, Sung-Mo (Steve) Kang; Electrothermal Analysis of VLSI Systems; Kluwer Academic Publishers, 2000, 116 pages.

Kaustav Banerjee, Amit Mehrotra, Alberto Sangiovanni-Vincentelli, Chenming Hu; On Thermal Effects in Deep Sub-Micron VLSI Interconnects; Proceedings of IEEE/ACM DAC 1999, pp. 885-891.

Ting-Yen Chiang, Kaustav Banerjee, Krishna C. Saraswat; Comact Modeling and SPICE-Based Simulation for Electrothermal Analysis of Multilevel ULSI Interconnects; Proceedings of IEEE/ACM ICCAD, 2001, pp. 165-172.

Zhiping Yu, Daniel Yergeau, Robert W. Dutton, Sam Nakagawa, and Jeff Deeney; Fast Placement-Dependent Full Chip Thermal Simulation; Proceedings of International Symposium on VLSI Technology, Systems and Applications, 2001, pp. 249-252.

Haihua Su, Frank Liu, Anirudh Devgan, Emrah Acar, Sani Nassif; Full Chip Leakage Estimation Considering Power Supply and Temperature Variations; ISLPED'03, Aug. 25-27, 2003, Seoul, Korea, pp. 78-83.

Kevin Skadron, Mircea R. Stan, Wei Huang, Sivakumar Velusamy, Karthik Sankaranarayanan, and David Tarjan; Temperature-Aware Microarchitecture; Proceedings of the 30th International Symposium on Computer Architecture, 2003, 12 pages.

Ching-Han Tsai and Sung-Mo (Steve) Kang; Cell-Level Placement for Improving Substrate Thermal Distribution; IEEE Transactions on Computer-Aided Design of Integrated Circuits and Systems, vol. 19, No. 2, Feb. 2000, pp. 253-266.

Brent Goplen and Sachin Sapatnekar; Efficient Thermal Placement of Standard Cells in 3D ICs using a Force Directed Approach; Proceedings of the International Conference on Computer Aided Design (ICCAD'03), pp. 86-89.

Gary B. Kromann; Thermal Management of a C4/Ceramic-Ball-Grid Array: The Motorola PowerPC603TM and PowerPC604TM RISC Microprocessors; Twelfth IEEE SEMI-THERMTM Symposium, 1996, pp. 36-42.

Stephen H. Gunther, Frank Binns, Douglas M. Carmean, Jonathan C. Hall; Managing the Impact of Increasing Microprocessor Power Consumption; Intel Technology Journal Q1, 2001, 9 pages.

Tomas Skalicky; LASPack Reference Manual (version 1.12.2), Dresden University of Technology Institute for Fluid Mechanics, Aug. 13, 1995, 52 pages.

Vivek De and Shekhar Borkar; Technology and Design Challenges for Low Power and High Performance; Proceedings of the Internation Symposium Low Power Electronics and Design, San Diego, CA, 1999, pp. 163-168.

James R. Black, Electromigration Failure Modes in Aluminum Metallization for Semiconductor Devices; Proceedings of the IEEE, vol. 57, No. 9, Sep. 1969, 14 pages.

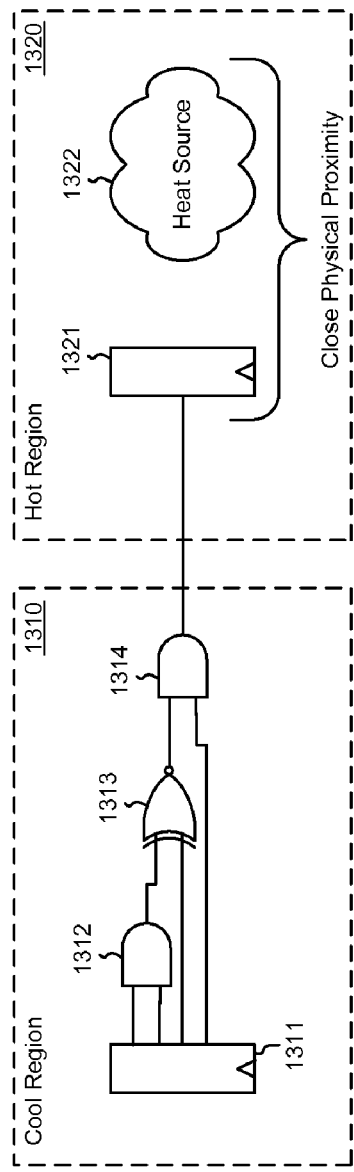
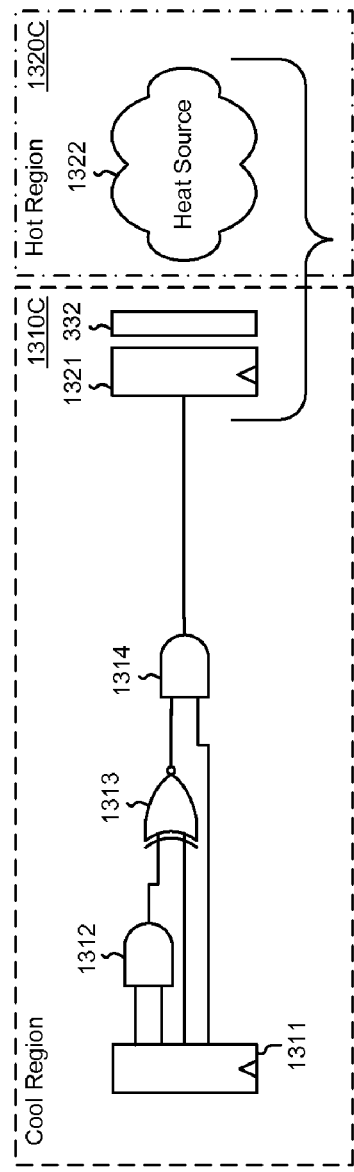
Fig. 13
Fig. 14

THERMALLY AWARE DESIGN MODIFICATION

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

PCT Application Serial No. PCT/US06/62184 filed Dec. 15, 2006, first named inventor Rajit Chandra, entitled Simulation of IC Temperature Distributions Using an Adaptive 3D Grid;

U.S. Provisional Application Ser. No. 60/744,405 filed Apr. 4, 2006, first named inventor Rajit Chandra, and entitled Simulation of IC Temperature Distributions Using an Adaptive 3D Grid Based on Design Variables and Material Characteristics;

U.S. application Ser. No. 11/317,664 filed Dec. 23, 2005, first named inventor Rajit Chandra, and entitled Method and Apparatus for Thermally Aware Design Improvement;

U.S. application Ser. No. 11/317,670 filed Dec. 23, 2005, first named inventor Rajit Chandra, and entitled Method and Apparatus for Generating and Using Thermal Test Vectors;

U.S. application Ser. No. 11/317,668 filed Dec. 23, 2005, first named inventor Rajit Chandra, and entitled Semiconductor Chip Design Having Thermal Awareness Across Multiple Sub-System Domains; and U.S. Provisional Application Ser. No. 60/751,376 filed Dec. 17, 2005, first named inventor Rajit Chandra, and entitled Semiconductor Chip Design Having Thermal Awareness Across Multiple Sub-System Domains.

BACKGROUND

1. Field

Advancements in semiconductor chip design are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, and a computer readable medium such as a computer readable storage medium or a computer network wherein program instructions are sent over optical or electronic communication links. In this specification, these implementations, or any other form that the invention may take, may be referred to as techniques. In general, the order of the operations of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of systems, methods, and computer readable media in accordance with the concepts described herein. As is discussed in more detail in the Conclusions, the invention encompasses all possible modifications and variations within the scope of the issued claims.

BRIEF DESCRIPTION OF DRAWINGS

FIG. 13 illustrates an example of a hold time problem recognized by thermally aware analysis.

FIG. 14 illustrates an example repair technique for the hold time problem of FIG. 13, as provided by thermally aware design improvement.

DETAILED DESCRIPTION

Figure 1A:
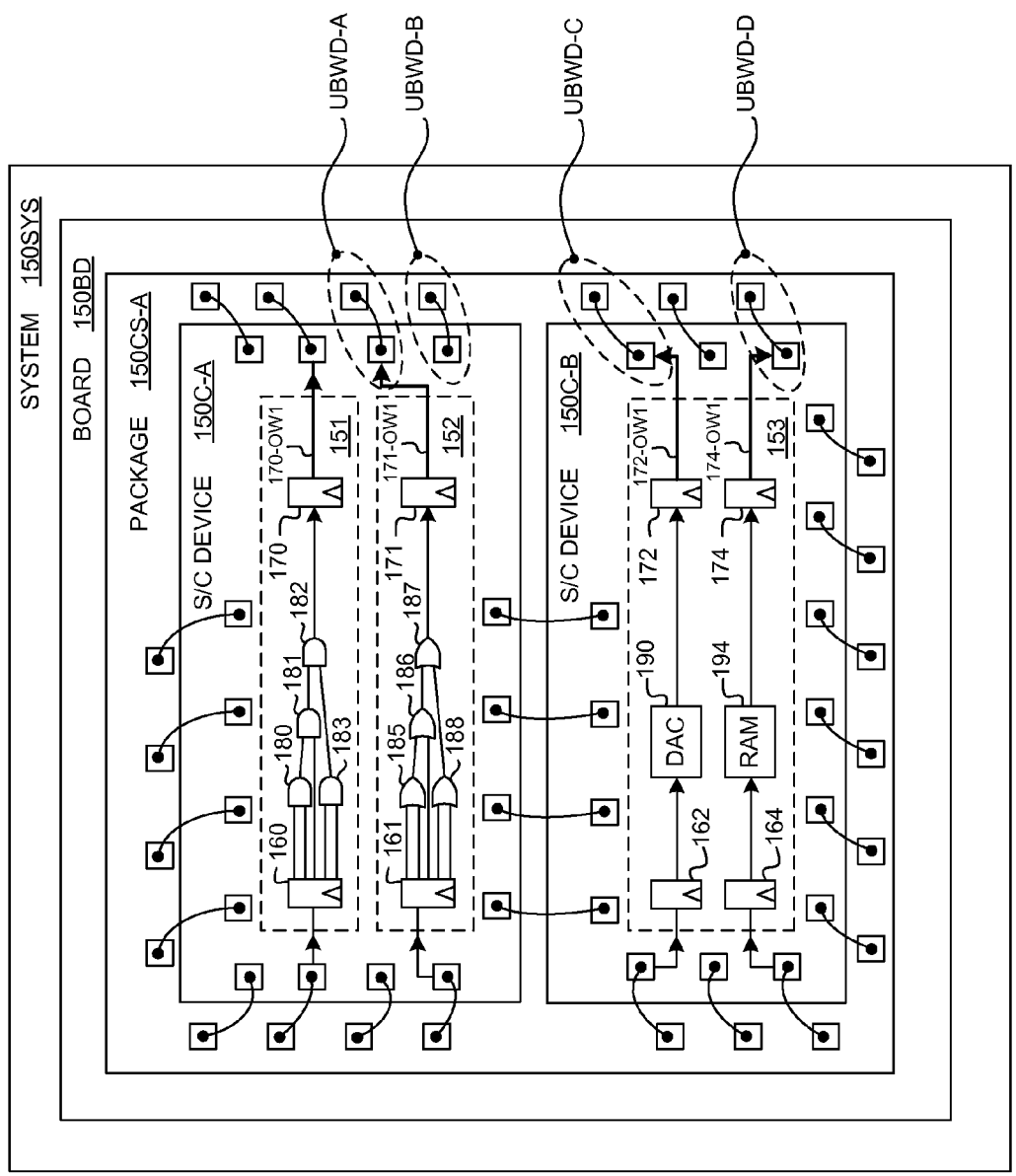
FIGS. 1A and 1B illustrate an embodiment of a system for improved design of semiconductor devices using thermally aware design automation to determine interconnect characteristics, including the width of selected wires and the density of selected wire bonds.

A detailed description of one or more embodiments of the invention is provided below along with accompanying figures that illustrate the principles of the invention. The invention is described in connection with the embodiments. The embodiments herein are understood to be merely illustrative, the invention is expressly not limited to or by any or all of the embodiments herein, and the invention encompasses numerous alternatives, modifications and equivalents. To avoid monotony in the exposition, a variety of word labels (including but not limited to: first, last, certain, particular, select, and notable) may be applied to separate sets of embodiments; as used herein such labels are expressly not meant to convey quality, or any form of preference or prejudice, but merely to conveniently distinguish among the separate sets. Wherever multiple embodiments serve to illustrate variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, are used to refer to certain elements. The descriptions of at least some of the acronyms follow.

| Acronym | Description |
| --- | --- |
| 2D | Two-dimension(al) |
| 3D | Three-dimension(al) |
| ASIC | Application Specific Integrated Circuit |
| CAD | Computer Aided Design automation |
| C4 | Controlled-Collapse Chip Connection |
| DEF | Design Exchange Format |
| ECO | Engineering Change Order |
| FF | Flip-Flop |
| GDSII | Graphics Design System II |
| GUI | Graphical User Interface |
| I/O | Input/Output |
| IC | Integrated Circuit |
| LEF | Library Exchange Format |
| P&R | Place and Route |
| PC | Personal Computer |
| R | Resistivity |
| RAM | Randomly Accessible Media |
| SPEF | Standard Parasitic Extraction File |
| STA | Static Timing Analysis |

A thermally aware design automation suite integrates system-level thermal awareness into the design of semiconductor chips. A thermal analysis engine performs fine-grain thermal simulations of the semiconductor chip based on thermal models and boundary conditions for all thermally significant structures in the chip and the adjacent system that impact the temperature of the semiconductor chip. The thermally aware design automation suite uses the simulations of the thermal analysis engine to repair or otherwise modify the thermally significant structures to equalize temperature variations across the chip, impose specified design assertions on selected portions of the chip, and verify overall chip performance and reliability over designated operating ranges and manufacturing variations. The thermally significant structures are introduced or modified via one or more of: change in number, change in location, and change in material properties.

A discretization approach effectively models semiconductor IC temperature distributions using heuristics to adaptively grid the space in 3D and simultaneously apply (heat equation) mathematical operators to solve for temperatures within the grid points. Adaptive and locally variable grid spacing techniques are used so that the mathematics converge efficiently and accurately for steady state and/or transient temperature solutions. In a first aspect, grid boundaries are selectively defined between IC materials having differing thermal conductance and the grid size is a function of at least some of the design variables and material characteristics as they are locally applied. In a second aspect, the grid size is a function of localized rates of change in at least some of the simulated thermally significant variables and the localized grid size is recomputed as the simulation progresses. Some embodiments use both aspects. The modeling is optionally provided via a thermal analysis shell. The shell reads various input files, including a mesh initialization file that specifies selected aspects and parameters associated with controlling the use and behavior of the variable grid spacing techniques.

More specifically, a thermally aware design automation suite is described herein for integrating system-level thermal awareness into the design of semiconductor chips. A thermal analysis engine performs fine-grain thermal simulations of the semiconductor chip based on thermal models and boundary conditions for all thermally significant structures in the chip and the adjacent system that impact the temperature of the semiconductor chip. The thermally aware design automation suite uses the simulations of the thermal analysis engine to repair or otherwise modify the thermally significant structures to equalize temperature variations across the chip, impose specified design assertions on selected portions of the chip, and verify overall chip performance and reliability over designated operating ranges and manufacturing variations.

Thermal-aware design automation techniques and functional sub-systems as described herein use three dimensional thermal analysis to develop simulated three dimensional chip temperature distributions to guide design changes to improve the temperature distribution (to meet chip design goals and avoid latent defects), to improve chip performance, and to improve chip reliability. One use of the thermal-aware techniques is to guide the selection between otherwise functionally interchangeable components, structures, or other design resources that are differentiated by respective thermal conductances, and thus are substituted, in some usage scenarios, to alter the chip temperature distribution to accomplish an intended result.

Thermal improvements (a.k.a. thermal repairs) of the design reduce, equalize, or smooth, temperatures in particular localized regions. Unimproved designs, in some usage scenarios, suffer from poor performance, poor reliability, or both. Unanticipated localized heating, in some usage scenarios, problematically changes circuit behavior due to increased IR-drops, slower transitions, and longer delays. Undesirable temperature distributions, in some usage scenarios, unbalances otherwise balanced circuits and creates signal integrity problems. Excessive temperature concentrations (hot spots), in some usage scenarios, exacerbates electromigration failure mechanisms.

Thermal improvements are achieved by the introduction or modification of thermally significant structures via, for example, a change in number, a change in location, or a change in material properties. Contemplated thermally significant structural modifications include: solder bump (e.g. C4-bump) location and density; solder-bump-related underfill composition; thermal via location, density, and metal composition; heat sink configuration including fin location, density, and height; metal fill location and density; wire location, width, and metal composition; bond wire location and density; and other thermally-related and thermally-affecting modifications.

Fabrication processes are contemplated to expand the available chip design resources (structure and/or components) to include otherwise equivalent components that are differentiated by respective thermal conductances. For example, the expanded fabrication processes enable at least some regions on at least one layer to be a selected one of a plurality of metallization types having respectively different elemental compositions. For example, a high heat conduction metal such as Ti, is optionally selectively used where enhanced thermal conductivity is needed or warranted. The special metallization is optionally used for vias, metal layers, or both. Vias (whether enhanced by special metallization or not) are optionally used to reduce local heating (for any of the reasons cited previously), to electrically couple circuitry on proximate metal layers, or both.

With respect to the discretization approach, an adaptive 3D grid analysis is used in accordance with stead-state and transient thermal analysis strategies. The transient analysis has associated thermal time constants. The adaptive 3D grid analysis is based on local grid determinations made with respect to thermal distributions, and a design characteristic indexed knowledge base. Split functions are special grid point location functions used to define magnitude and direction of grid point spacing (in 3D). The split functions are optionally associated with design assertions, and optionally vary according to analysis phase.

EXAMPLE EMBODIMENTS

In various embodiments, various grid selection techniques enable run time efficiency of VLSI design heat transfer analysis. In some embodiments, the heat transfer analysis is according to a steady-state scenario. In some embodiments, the heat transfer analysis is according to a transient scenario. In some embodiments, the heat transfer analysis is according to steady-state and transient scenarios.

In some embodiments, grid techniques are used for accurate determination of temperature distribution in scenarios with materials having varying conductivity and heat capacitance. In some embodiments, course grid partitioning is based on thermal properties related to thermal conductivity, power density, power source shape, power source sizes, power source positions in relation to other power sources and material boundaries, thermal time constants of self-heating, and thermal time constants of heat propagation.

In some embodiments, grid size is determined based on a zone of influence of a thermal aggressor on a thermal victim (analogous to signal integrity). In some embodiments, repair techniques are used to minimize the influence of the aggressor. In some embodiments, the zone of influence is with respect to aggressor-victim sets. In some embodiments, techniques based on principles of superposition are used for multiple aggressors and optimization techniques for computation efficiency. In some embodiments, the thermal victim is a plurality of thermal victims.

In some embodiments, thermal time constants of thermal aggressor-victim coupled sections are extracted.

In some embodiments, split functions using spatial heat distribution, transient temperature, or both, are developed.

In some embodiments, split functions are enabled to adaptively optimize grid size based on a range of distribution criteria. In various embodiments, the range of distribution criteria are one or more of equal temperature gradients, equal power gradients, equal temperature profile based on shape factor and adiabatic temperature contours, power source shape, temperature rise or fall times, and other distribution criteria.

In some embodiments, split functions are used for transient thermal processing. In some embodiments, split functions are used for transient thermal processing and mapping to steady state grid sections.

Particular System-Level Thermally Aware Improvements

Figure 1B:
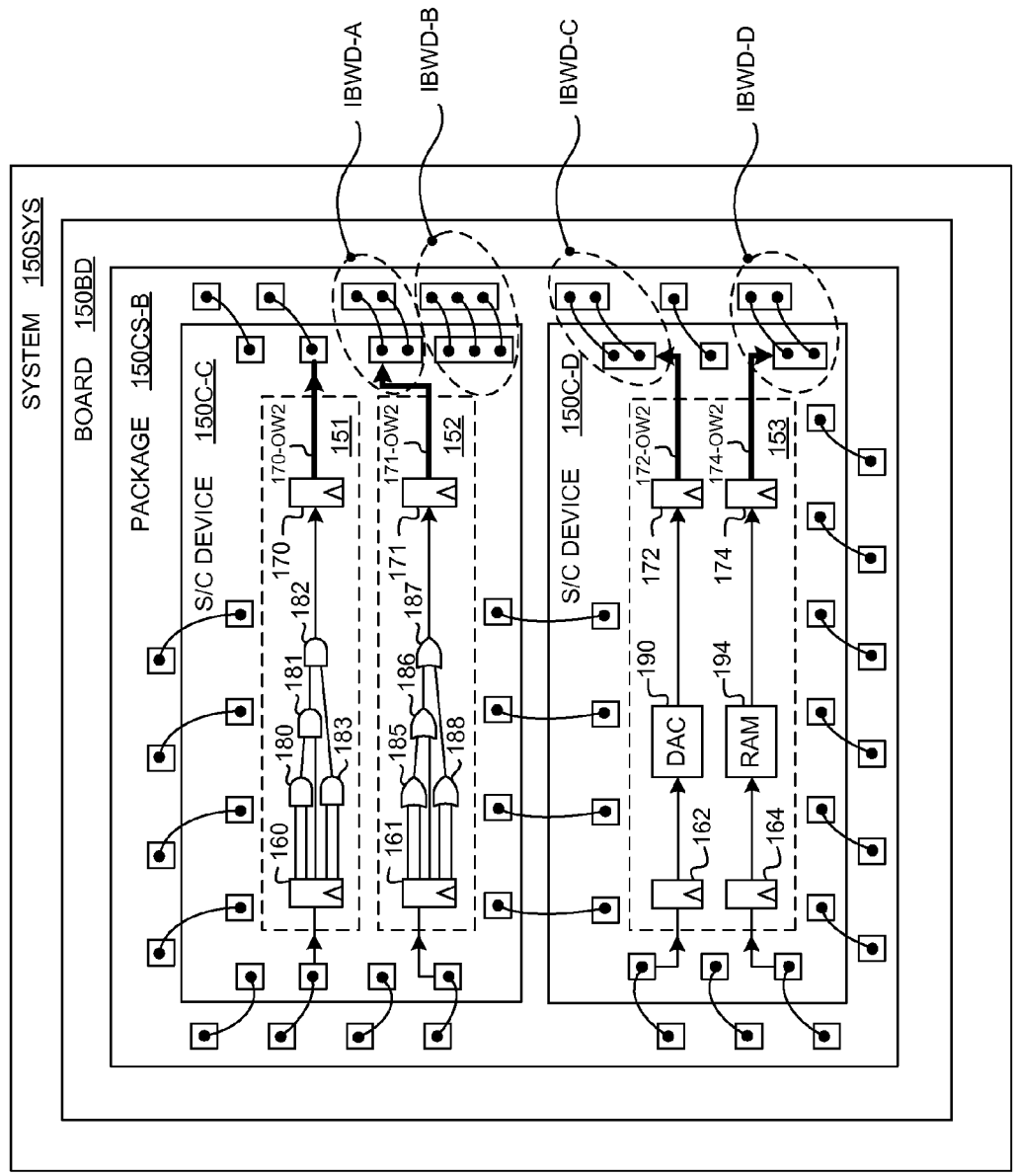

FIGS. 1A and 1B illustrate a system where the design of semiconductor devices is improved using thermally aware design to analyze and automatically improve the thermal characteristics of interconnect, including the width of selected wires and the density of selected wire bonds. FIG. 1A illustrates system 150SYS, including board 150BD having unimproved package 150CS-A with unimproved semiconductor devices 150C-A and 150C-B, having respective digital and mixed signal electronics as illustrated. FIG. 1B illustrates system 150SYS, including board 150BD having improved package 150CS-B with improved semiconductor devices 150C-C and 150C-D.

In comparing FIGS. 1A and 1B, attention is first drawn to the wire widths of the outputs of flip-flops 170, 171, 172, and 174. In FIG. 1A, respectively the wire widths are 170-OW1, 171-OW1, 172-OW1, and 174-OW1, where OW1 signifies "output width 1". In FIG. 1B, respectively the wire widths are 170-OW2, 171-OW2, 172-OW2, and 174-OW2, where OW2 signifies "output width 2". In further comparing FIGS. 1A and 1B, attention is next drawn to the number of wire bonds (the wire bond density) used as interconnect between the two semiconductor devices and the package for various nodes. Exemplary wire bond couplings in FIG. 1A are identified as UBWD-A, UBWD-B, UBWD-C, and UBWD-D, where UBWD signifies "unimproved wire bond density". Corresponding wire bond couplings in FIG. 1B are identified as IBWD-A, IBWD-B, IBWD-C, and IBWD-D, where IBWD signifies "improved wire bond density".

The above examples are suggestive of the types of improvements (a.k.a. repairs) selectively made to wires to selectively alter the temperature profile of the chip in a selected region. More generally, in response to a thermal analysis in accordance with the descriptions herein, wire thermal characteristics are optionally altered by one or more of the following exemplary approaches: changing wire routing, changing the width of one or more wires, changing the resistivity of one or more wires, changing the elemental composition of one or more wires, and changing other properties associated with wires. In the foregoing, the term "wire" includes but is not limited to patterned chip interconnect (such as patterned source/drain, poly, or metal), patterned package interconnect, and wire bonds. Metallization and vias, while also forms of interconnect subject to similar modification, are treated separately below.

Figure 2A:
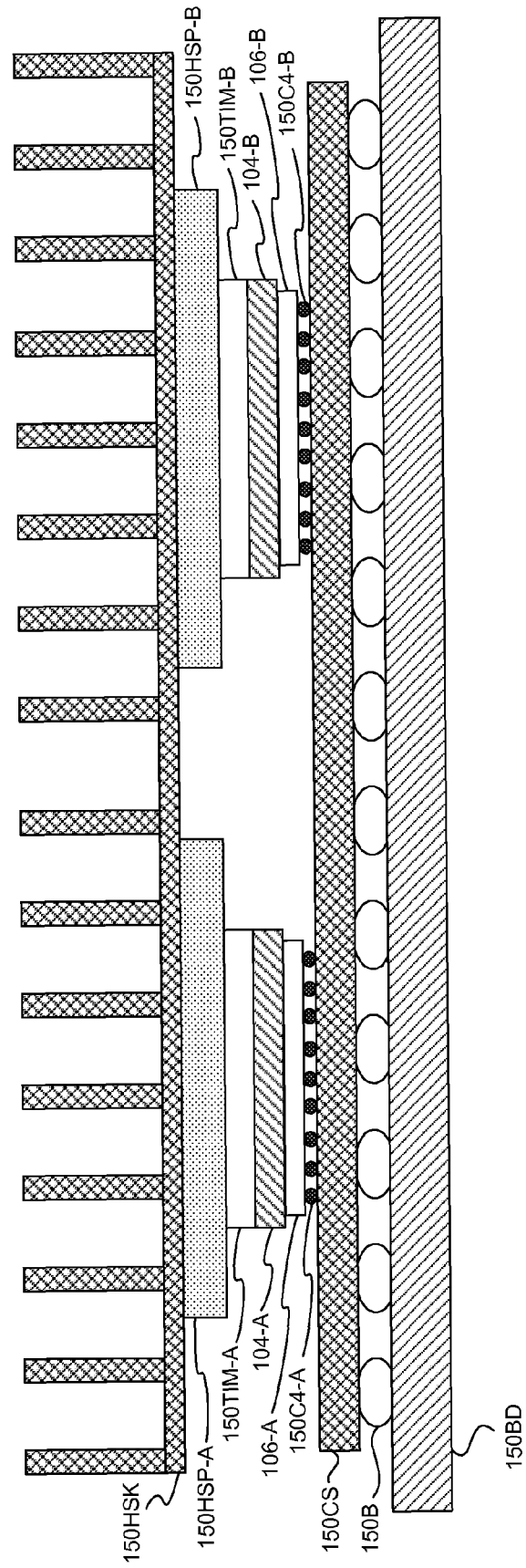
FIGS. 2A through 2C illustrate an embodiment of a system for improved design of semiconductor devices using thermally aware design automation to determine system boundary condition characteristics, including the density of selected C4 Pads and the configuration of selected portions of the heat sink.
Figure 2B:
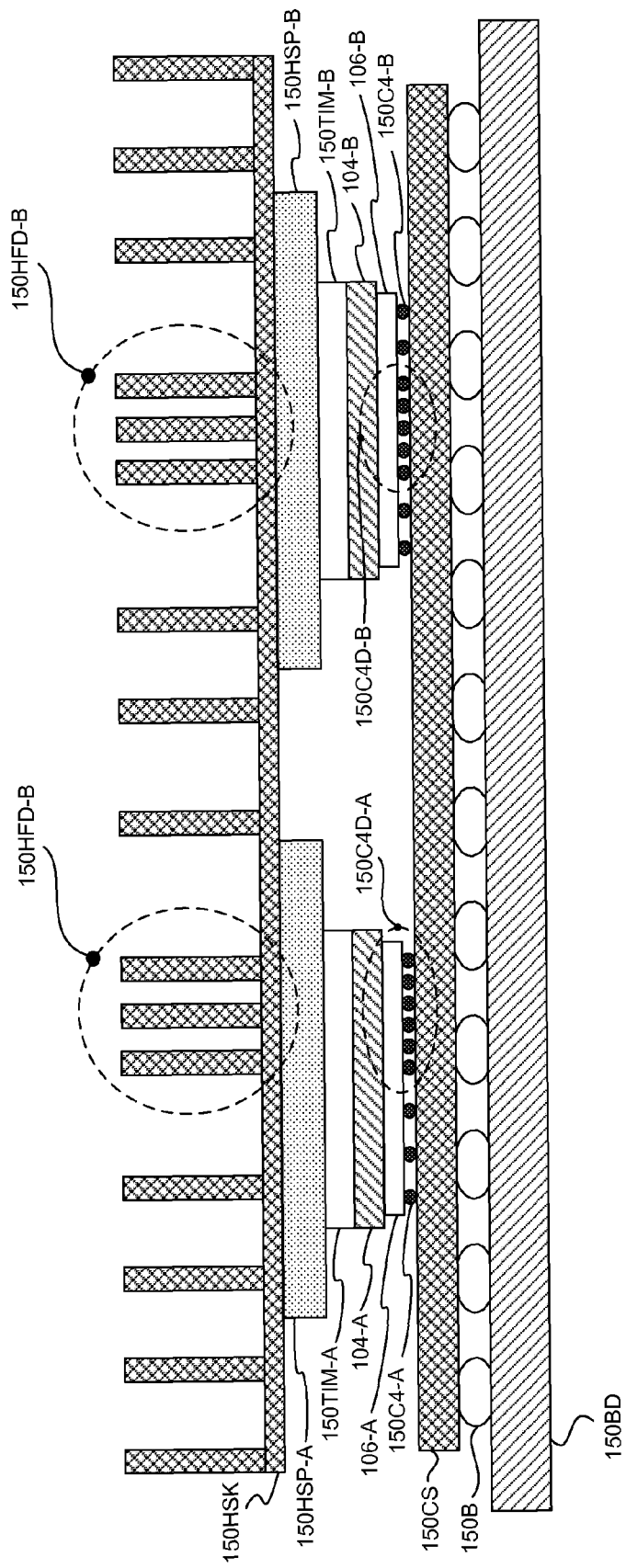
Figure 2C:
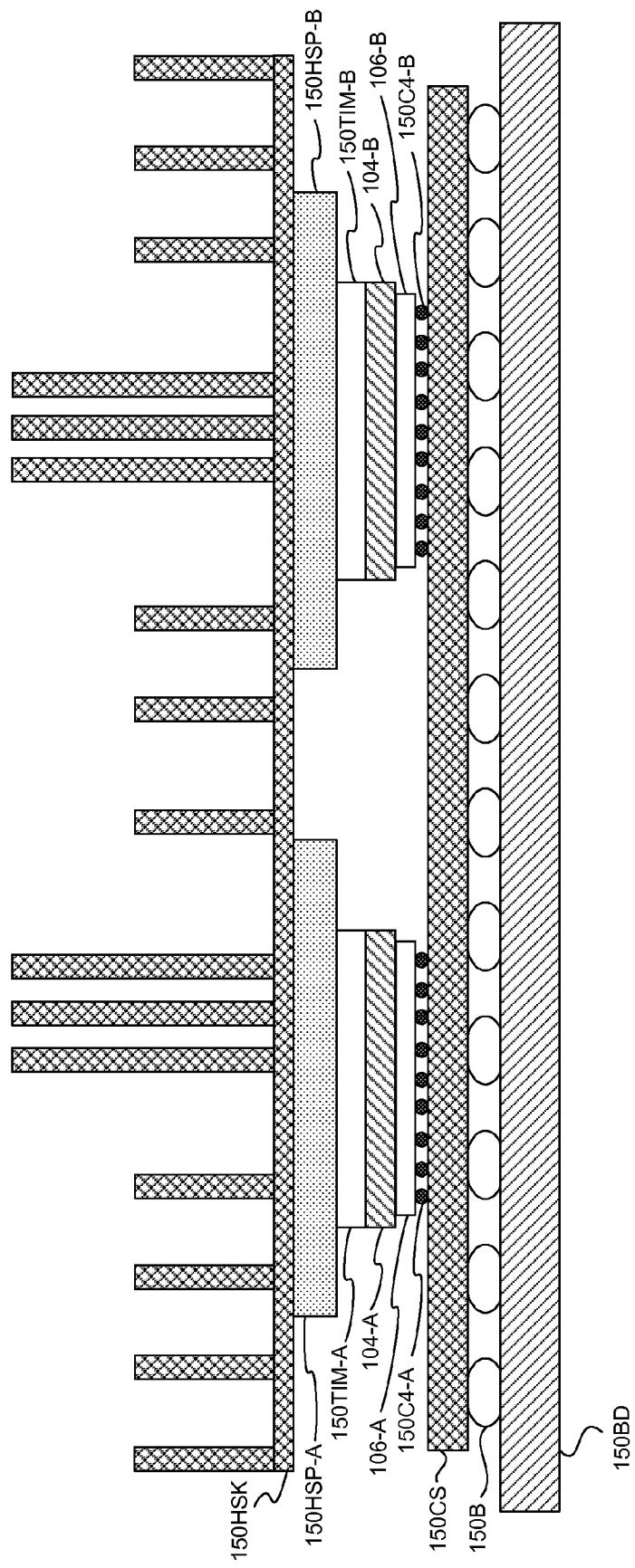

FIGS. 2A through 2C illustrate a system where the design of semiconductor devices is improved using thermally aware design automation to improve system boundary condition characteristics (with respect to the semiconductor device), including changes in the density of selected C4 Pads and the configuration of selected portions of the heat sink. (Note that in FIGS. 2A-2C, the "-A" and "-B" suffixes correspond to the left and right chips, respectively.) Components common in FIGS. 2A through 2C include printed-circuit board 150BD, ball grid array solder joints 150B, ceramic substrate 150CS, C4 bumps (a.k.a. solder bumps) and underfill (a.k.a. encapsulation) instances 150C4-A and 150C4-B, interconnect layer instances 106-A and 106-B, silicon bulk instances 104-A and 104-B, thermal interface material instances 150TIM-A and 150TIM-B, heat spreaders 150HSP-A and 150HSP-B, and heat sink 150HSK. In comparing FIGS. 2A and 2B, attention is directed to the change in heat sink fin distribution associated with the regions identified by 150HFD-A and 150HFD-B in FIG. 2B and further by the change in C4 bump distribution associated with the regions identified by 150C4D-A and 150C4D-B (also in FIG. 2B). In FIG. 2C, the height of selected heat sink fins has also been changed.

The above examples are merely suggestive of the types of improvements or repairs that are selectively made to system (extra-chip) thermal boundary conditions to selectively alter the temperature profile of a chip (or chips) in one or more selected regions. More generally, in response to a thermal analysis in accordance with the descriptions herein, system thermal boundary characteristics are selectively altered by one or more of the following exemplary approaches: changing the configuration of die-to-package attachment, package design, heat dissipater design, and changing other elements affecting the system thermal boundary characteristics.

In turn, the thermal characteristics of the die-to-package attachment are alterable by one or more of the following exemplary approaches: changing the configuration of solder bumps, final metal attachment pads (for solder bumps or wire bonds), underfill (an optional encapsulant between the solder bumps), and changing other elements affecting the thermal characteristics of the die-to-package attachment. The thermal characteristics of the solder bumps is alterable, for example, by one or more of: changing the number, placement, density, and elemental composition of one or more solder bumps in at least one region; and changing other mechanical or material properties relating to the thermal characteristics of the solder bumps. The thermal characteristics of final metal attachment pads are alterable, for example, by one or more of: changing the number, placement, density, distribution, and elemental composition of one or more final metal attachment pads in at least one region; and changing other characteristics affecting the thermal characteristics of the metal attachment pads. The thermal characteristics of the underfill are alterable by one or more of: changing the application and elemental composition of the underfill in at least one region, and changing other thermal characteristics of the underfill. The thermal characteristics of the package design are alterable by one or more of: changing the package interconnect, metallization, and vias; and changing other parameters affecting the thermal characteristics of the package design. The thermal characteristics of the heat dissipater design are alterable by one or more of: changing the number, placement, orientation, geometry, height, density, and elemental composition of one or more heat sink fins in at least one region; and changing other factors affecting the thermal characteristics of the heat dissipater.

Figure 3A:
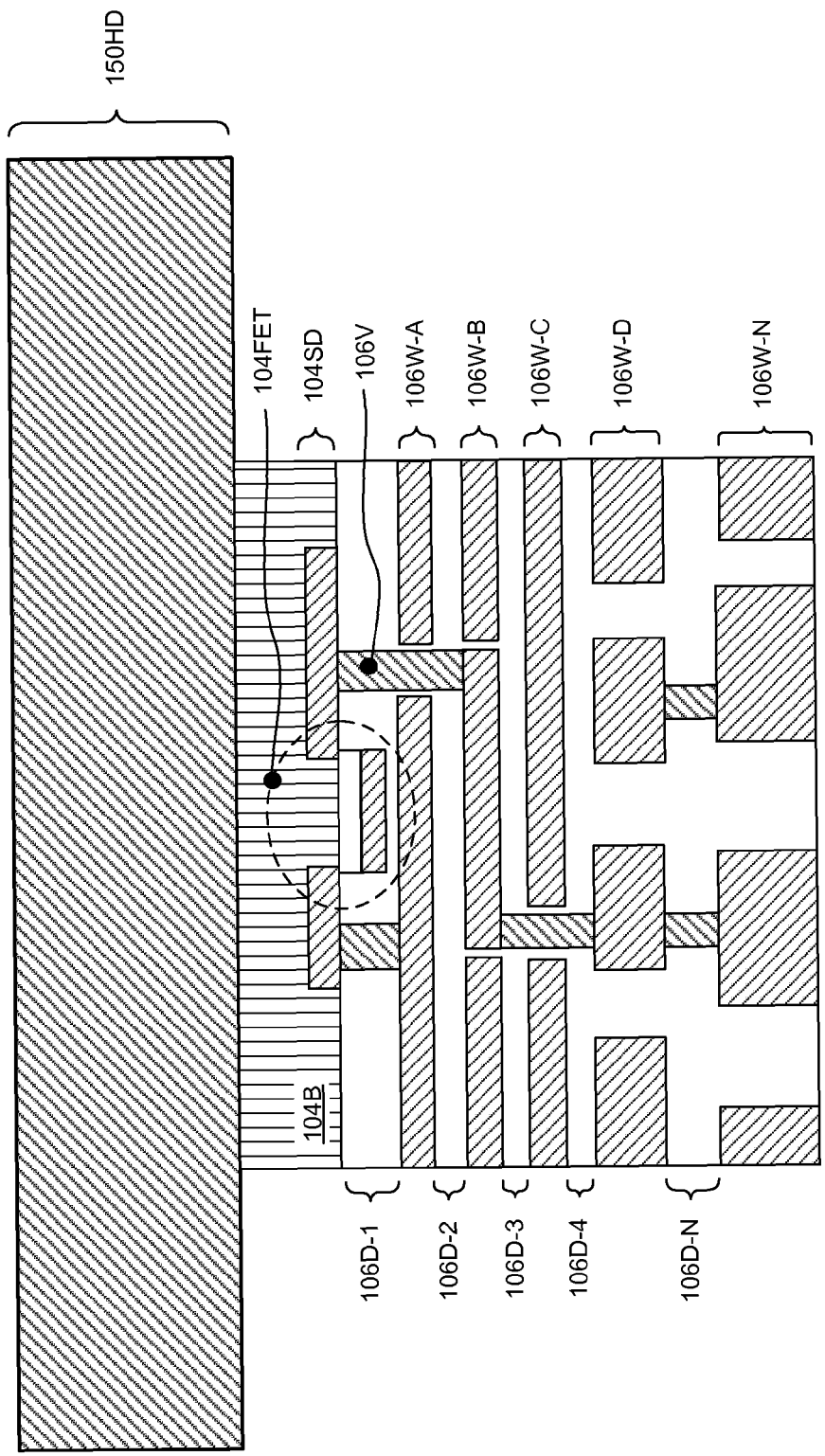
FIGS. 3A through 3C illustrate an embodiment of a semiconductor device improved using thermally aware design automation to determine interconnect characteristics, including the configuration of selected vias and the material property of selected wires.
Figure 3B:
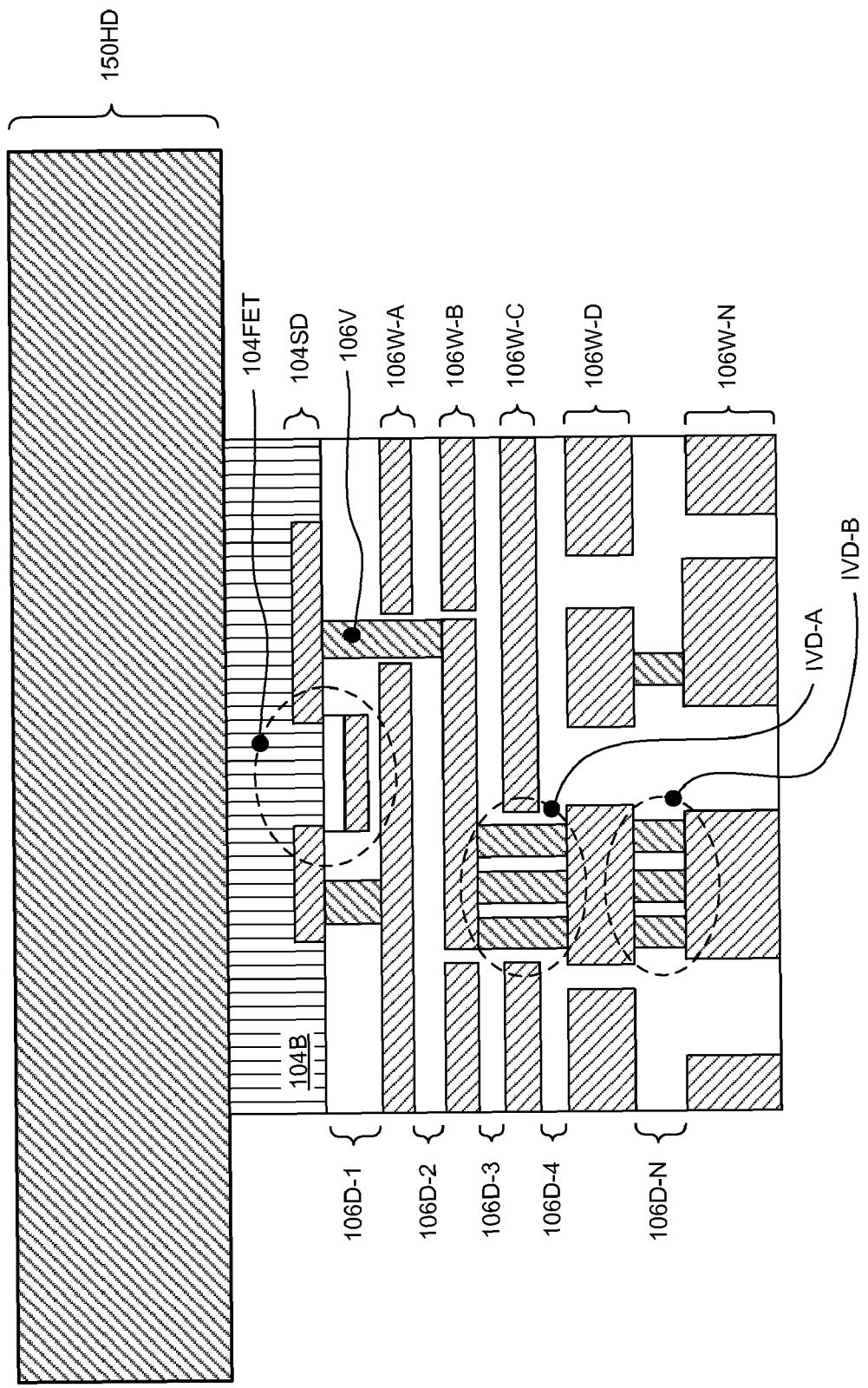
Figure 3C:
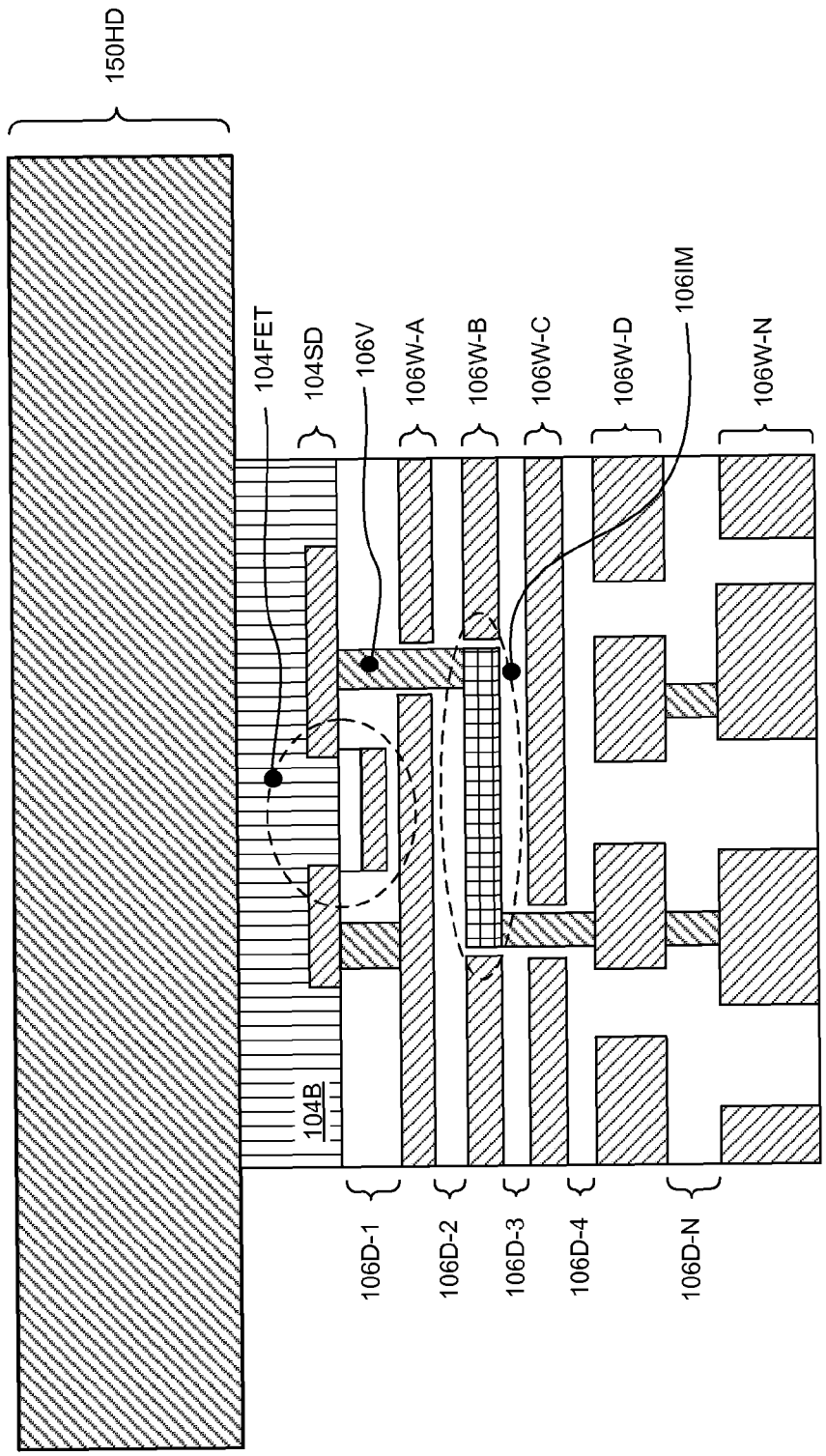

FIGS. 3A through 3C illustrate a semiconductor device improved using thermally aware design automation to determine interconnect characteristics, including the configuration of selected vias and the material property of selected wires. Components common in FIGS. 3A through 3C include: heat dissipater 150HD (representing one or more of the thermal interface material, heat spreader, and heat sink of FIGS. 2A-2C); semiconductor bulk 104B; source/drain region 104SD; field effect transistor 104FET; dielectric insulations layers 106D-1, 106D-2, 106D-3, 106D-4, and 106D-N; local wire (conducting) layer 106W-A, intermediate scope wire layers 106W-B and 106W-C, semi-global wire 106W-D, and global wire 106W-N; and via 106V.

When compared to FIG. 3A, FIG. 3B draws attention to improved via density IVD-A and IVD-B between multiple layers of interconnect. The improved via density is representative of one of many types of improvements or repairs selectively made to vias to selectively alter the temperature profile of a chip in one or more selected regions. More generally, in response to a thermal analysis in accordance with the descriptions herein, vias are alterable by one or more of: changing the number, placement, density, arrangement, cross section, resistivity, and elemental composition of one or more vias in at least one region; and changing other parameters associated with the location and thermal properties of the vias.

When compared to FIG. 3A, FIG. 3C draws attention to improved metallization 106IM in a selected portion of conducting layer 106W-B. That is, metallization with a different elemental composition than the surrounding metallization has been used in the highlighted wire segment to selectively alter the temperature profile in the illustrated region of the chip. The different elemental composition is representative of one of many types of improvements or repairs selectively made to metallization to selectively alter the temperature profile of a chip in one or more selected regions. More generally, in response to a thermal analysis in accordance with the descriptions herein, metallization is alterable by one or more of: changing the location, patterning, cross section, thickness, tile arrangement, tile density, and elemental composition of the metallization in at least one region; and changing other parameters associated with the location and the thermal properties of the metallization.

Figure 4A:
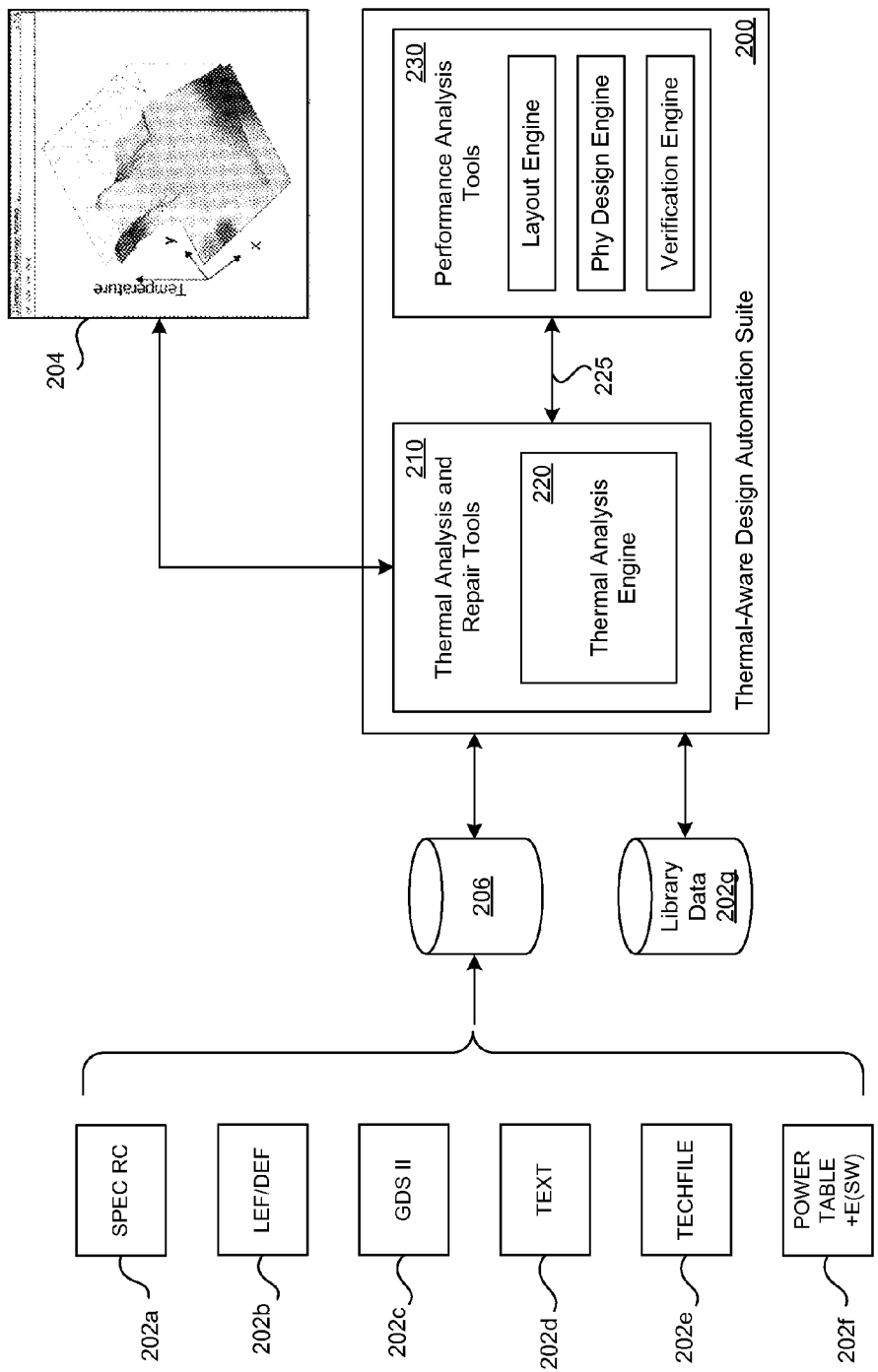
FIG. 4A illustrates selected components of an embodiment of a thermally aware design automation suite system and its related inputs, data, and output.

FIG. 4A illustrates selected components of a Thermal-Aware Design Automation Suite 200 with related inputs, data, and output. As illustrated, Thermal-Aware Design Automation Suite 200 is adapted to receive a plurality of inputs 202a-202g (hereinafter collectively referred to as "inputs 202") and process inputs 202 to produce a full-chip (e.g., three-dimensional) thermal model 204 of a proposed semiconductor chip design.

In some embodiments, the plurality of inputs 202 includes industry standard design data 202a-202f (e.g., pertaining to the actual chip design or layout under consideration) and library data 202g (e.g., pertaining to the semiconductor devices and interconnects incorporated in the design). The industry standard design data optionally includes one or more of the following types of data: electrical component extraction data and extracted parasitic data (e.g., embodied in SPEFs 202a), design representations including layout data (e.g., embodied in LEF/DEF files 202b, GDSII files 202c and/or text files 202d), manufacturer-specific techfiles 202e describing layer information and package models, user-generated power tables 202f including design data (e.g., including a switching factor, E(sw)). In one embodiment, industry standard design data 202a-202f is stored in a design database 206 such as an open access database or a proprietary database. In one embodiment, the library data 202g is embodied in a library that is distributed by a semiconductor part manufacturer or a library vendor. In another embodiment, the library incorporating the library data 202g is built in-house by a user.

As illustrated, Thermal-Aware Design Automation Suite 200 includes performance analysis tools 230 and thermal analysis and repair tools 210. The performance analysis tools 230 optionally include engines (software sub-systems) for providing layout, physical design, and verification services (callable tasks and procedures). The thermal analysis and repair tools include a thermal analysis engine 220 and generate the full-chip thermal model 204 of the semiconductor chip under design.

Figure 4B:
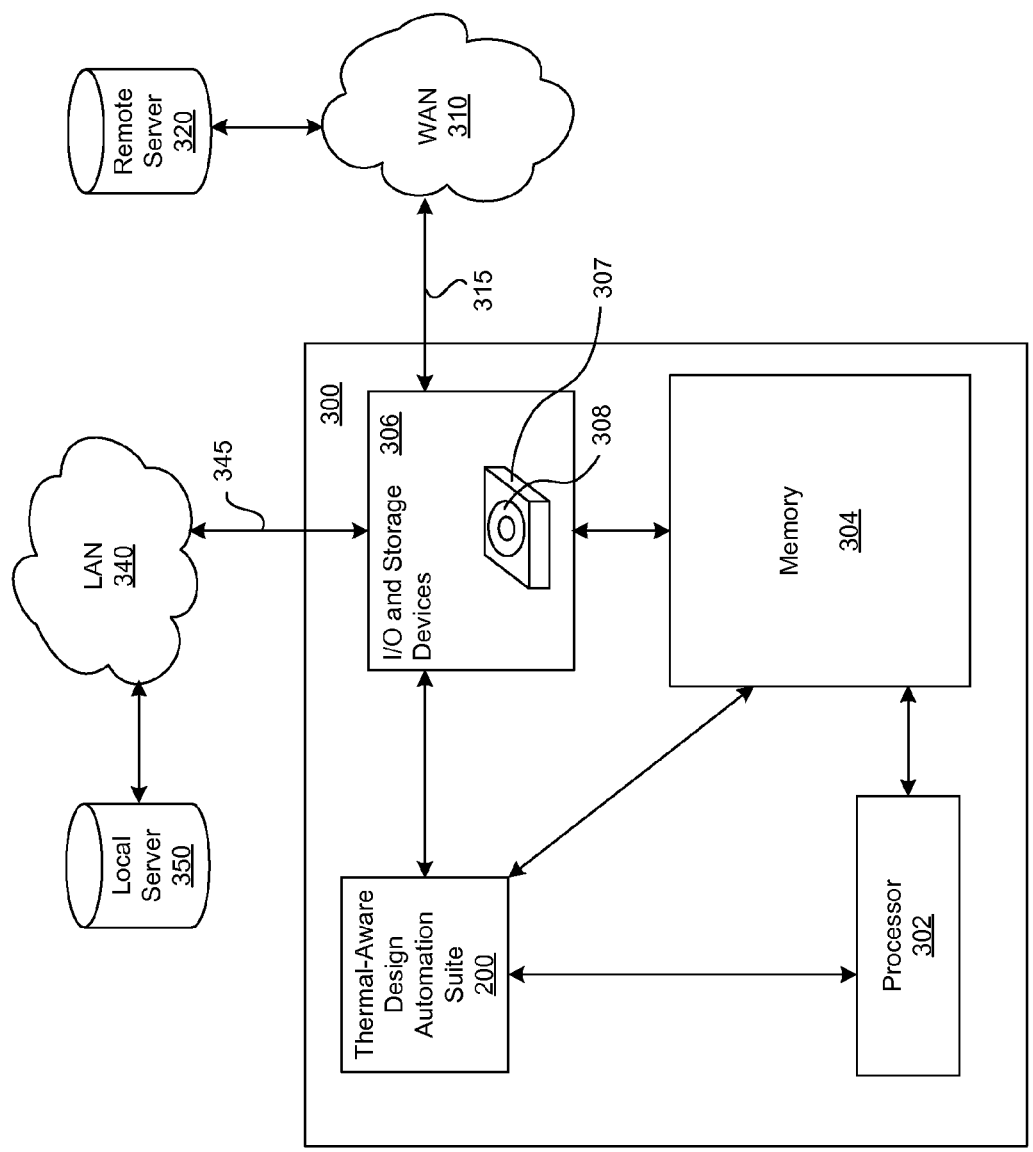
FIG. 4B illustrates the system environment associated with the thermally aware design automation suite of FIG. 4A.

FIG. 4B illustrates the system environment associated with the thermally aware design automation suite of FIG. 4A. Computer System 300 is a general purpose computing system such as a PC, Workstation, or Server, and includes a Processor 302, a Memory 304, Thermal-Aware Design Automation Suite 200, and various I/O and Storage Devices 306. The I/O and Storage Devices module includes any combination of a display, a keyboard, a mouse, a modem, a network connection, a magnetic disk drive, an optical disk drive, and similar devices. In some embodiments, several or all of the aforementioned procedures (such as "Thermal Analysis and Repair Tools" 210, "Thermal Analysis Engine 220" 220, and optionally portions of "Performance Analysis Tools" 230) are implemented via Thermal-Aware Design Automation Suite 200.

In some embodiments, Thermal-Aware Design Automation Suite 200 is provided as a physical device or sub-system that is coupled to a processor through a communication channel. Alternatively, the Thermal Computation Module is provided as one or more software applications (or even a combination of software and hardware, e.g., using ASICS), where the software is loaded from a storage medium (such as from I/O and Storage Devices 306) and operated by Processor 302 in Memory 304 of Computer System 300. Thus, in some embodiments, Thermal-Aware Design Automation Suite 200, described herein with reference to the preceding figures, is stored on a computer readable medium or carrier (e.g., RAM, magnetic or optical drive or diskette, and similar storage media; see removable media 307 and media reader 308).

Additionally, the software optionally runs in a distributed or partitioned fashion on two or more computing devices similar to Computer System 300. The collaborating computing devices are optionally linked via network connection 345 to Local Area Network 340 and via network connection 315 to Wide Area Network 310. Furthermore, networked Local Server 350 and Remote Server 320 are used, in various embodiments, for one or more of library and data storage, program updates, license validation, and other uses.

Figure 4C:
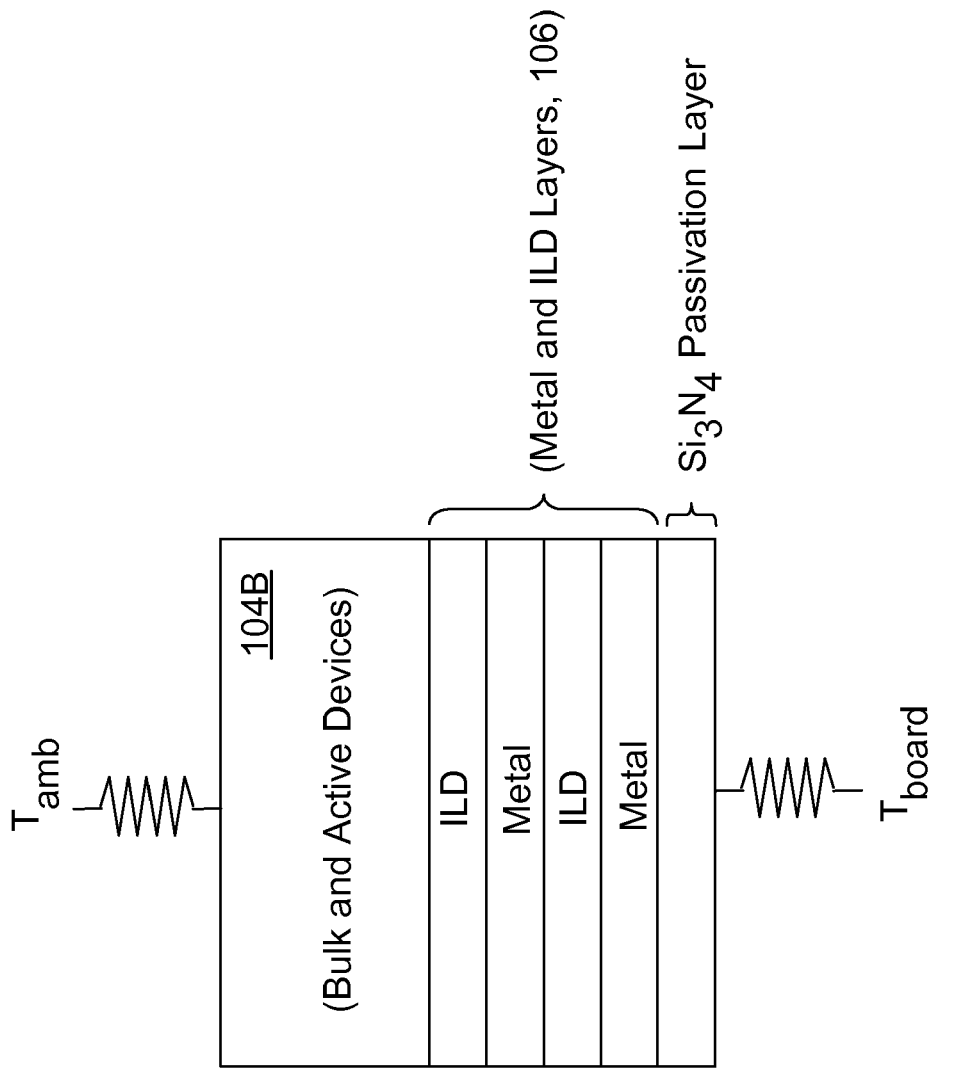
FIG. 4C illustrates a simplified view of a thermal model used by the thermally aware design automation suite of FIGS. 4A and 4B, in conjunction with the modeling of the semiconductor devices of FIGS. 3A through 3C, and in particular in the system contexts of FIGS. 2A through 2C.

FIG. 4C illustrates a simplified view of a thermal model used by the thermally aware design automation suite of FIGS. 4A and 4B, in conjunction with the modeling of the semiconductor devices of FIGS. 3A through 3C, and in particular in the system contexts of FIGS. 2A through 2C. The full chip thermal model accounts for boundary conditions, such as the packaging, board, and heat sink configuration and design, as well as material anisotropy and conductance (K) variations. The thermal conductance of the substrate layer is modeled according to the density and/or presence of active devices and implanted interconnect. The thermal conductance of each inter-layer dielectric layer is respectively modeled according to the density and/or presence of vias/contacts (made using e.g., TiN and/or $WTiSi_2$) vs. dielectric isolation (e.g., $SiO_2$ and/or $Si_3N_4$). The thermal conductance of each metal layer is respectively modeled according to the density and/or presence of metallization vs. dielectric isolation.

User interface features of enhanced temperature aware analysis tools are illustrated with reference again to FIG. 4D. As indicated by the slider on the right of FIG. 4D, the particular profile illustrated is for a depth of the chip selected to correspond to the channel region. Selection of other depths via the slider results in presentation of the temperature profile at the selected chip depth.

Figure 4D:
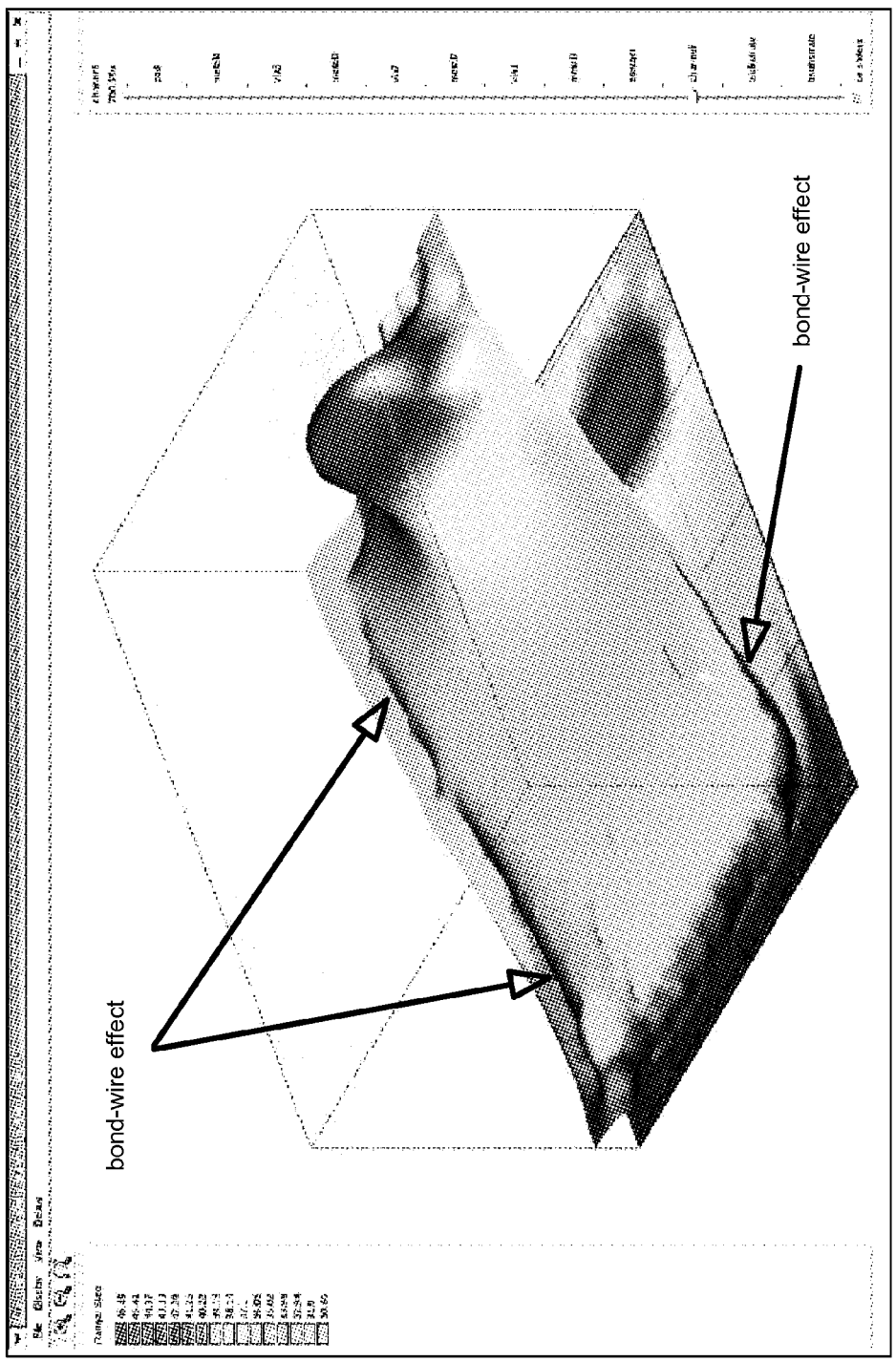
FIG. 4D is a grayscale rendition of a colorized three-dimensional surface representing the temperature profile across a die, including considering package characteristics as boundary conditions.

In FIG. 4D the vertical axis corresponds to temperature and increasing heights on the three-dimensional surface correspond to increasing temperature on the chip. The three-dimensional surface profile presents height gradients that are proportional to the temperature gradients on the chip. In addition to representing temperature by the height, in full-color versions of FIG. 4D, gradations of color are mapped onto select intervals of the temperature range, as illustrated by the "Range" legend in the upper left. In full-color versions of FIG. 4D, the legend boxes have gradations of the color spectrum progressively ranging from violet at the lowest temperatures in the range illustrated, through blue, green, yellow, orange, and red for the highest temperature in the range. Thus in full-color versions of FIG. 4D, temperature is redundantly represented by the height of the three-dimensional surface and the color of the surface. The height gradient and the color mapping each provides readily perceived visual clues of precisely how the temperature varies over the extent of the chip. In full-color versions of FIG. 4D, the color of the three-dimensional surface is also projected onto the plane lying underneath the surface. The color projection contains the same color information as the three-dimensional surface, but without the height information.

Figure 4E:
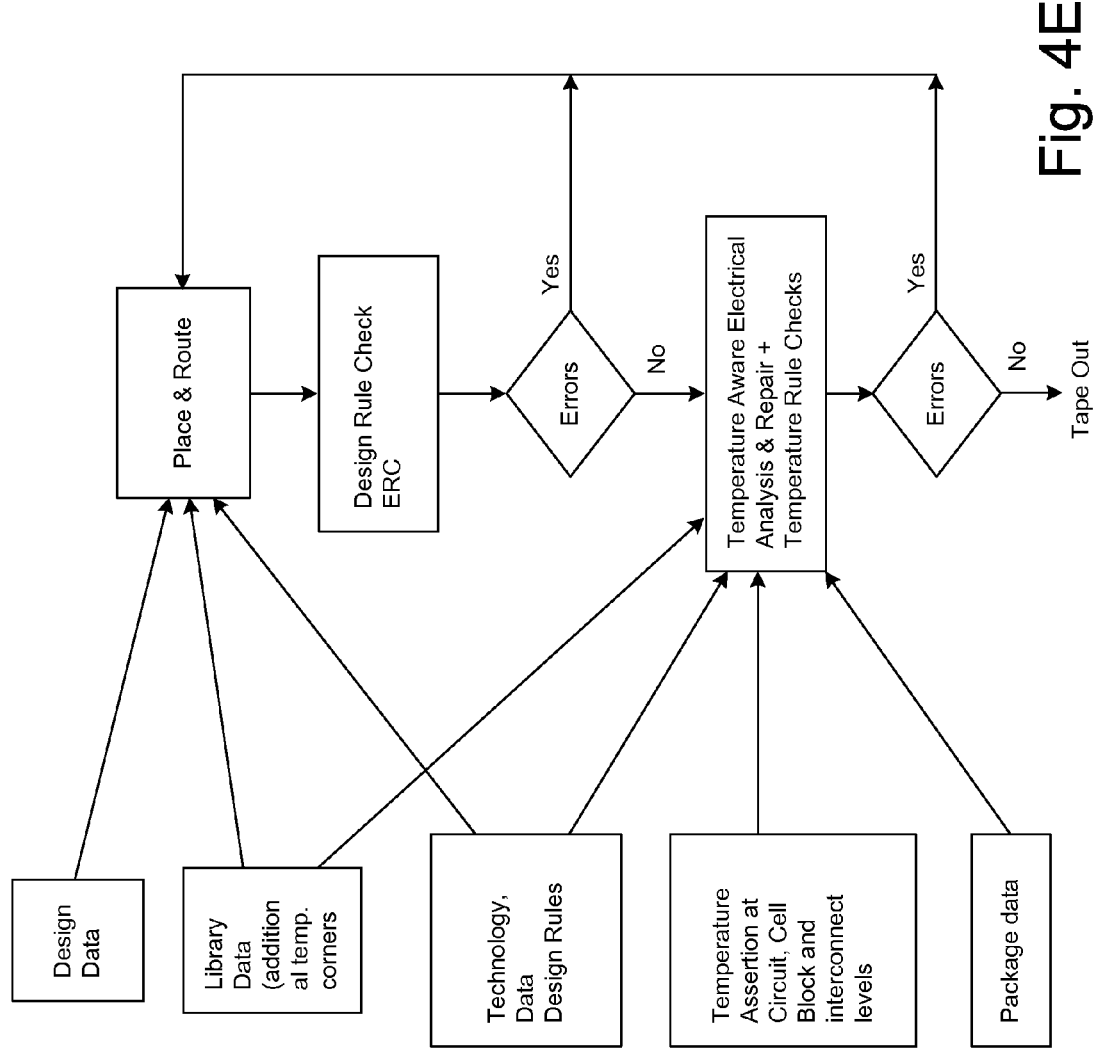
FIG. 4E illustrates an examplary temperature-aware design flow.

FIG. 4E illustrates an embodiment of a temperature-aware design flow, illustrating use of a temperature analysis and repair capability. The temperatures for all parts of the chip are computed and then used in conjunction with existing flows to achieve temperature aware analysis and repair. In some embodiments, temperatures are computed using one or more of the techniques described in the various patent applications listed in the cross-reference section above.

The inputs to the temperature-aware flow are the design layout data, the stack description and technology data for the materials used, and the package characteristics. In some embodiments, the inputs also include assertions on the temperature requirements for the correct operation of the circuits and the long-term reliability of the chip. The temperature-aware flow, in conjunction with a proper thermal analysis, optionally uses the assertions to provide information to design a chip that meets new temperature-aware criteria, leading to shorter design cycles and more reliable and lower-power chips.

Assertions are global to the whole chip (e.g., temperature within a certain range anywhere on the chip), or alternatively associated with some physical or logical structure in the chip (e.g., the clock net is within a certain temperature range, a set of transistors are at the same temperature, etc.). In some embodiments, assertions directly or indirectly (by a tool enforcing the assertion) cause circuit elements to be moved, transistor types to be changed, heating or cooling elements to be inserted, etc. In some embodiments, assertions operate in conjunction with package-level thermal analysis, where modifications of the package, as well as the die, are used to help solve on-chip thermal problems.

Temperature-Aware Analysis Flows and Associated Use Models

Figure 5:
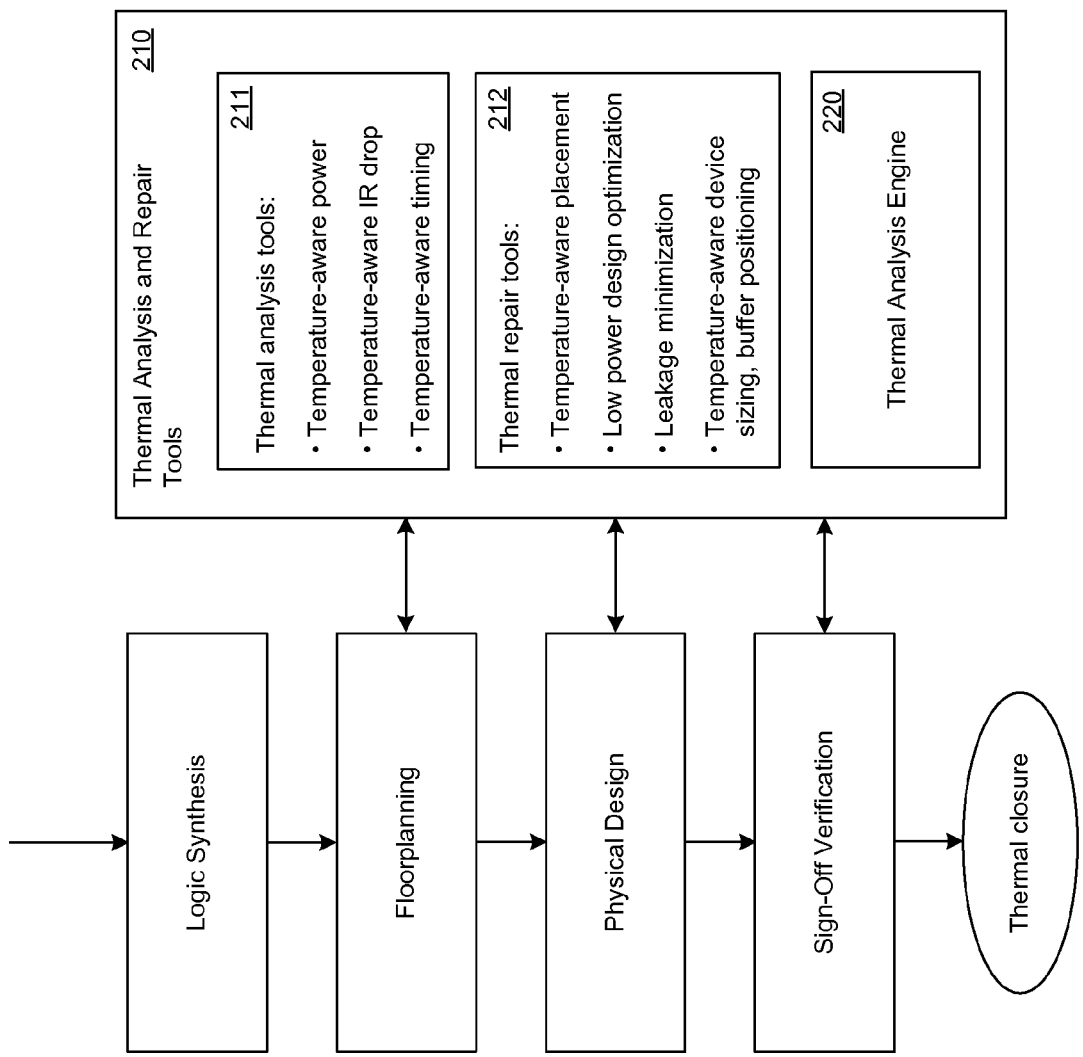
FIG. 5 illustrates an embodiment of integrating thermal awareness into existing design flows.

This section describes how current power analysis, voltage drop analysis, and timing analysis flows are made temperature aware. The analyses apply at various stages of a design flow as illustrated by FIG. 5, illustrating an embodiment of a digital design flow and the usage of temperature aware analysis within the flow. FIG. 5 also illustrates where repair capabilities are applicable within the design flow. The following section focuses on selected details of repair techniques.

Figure 6A:
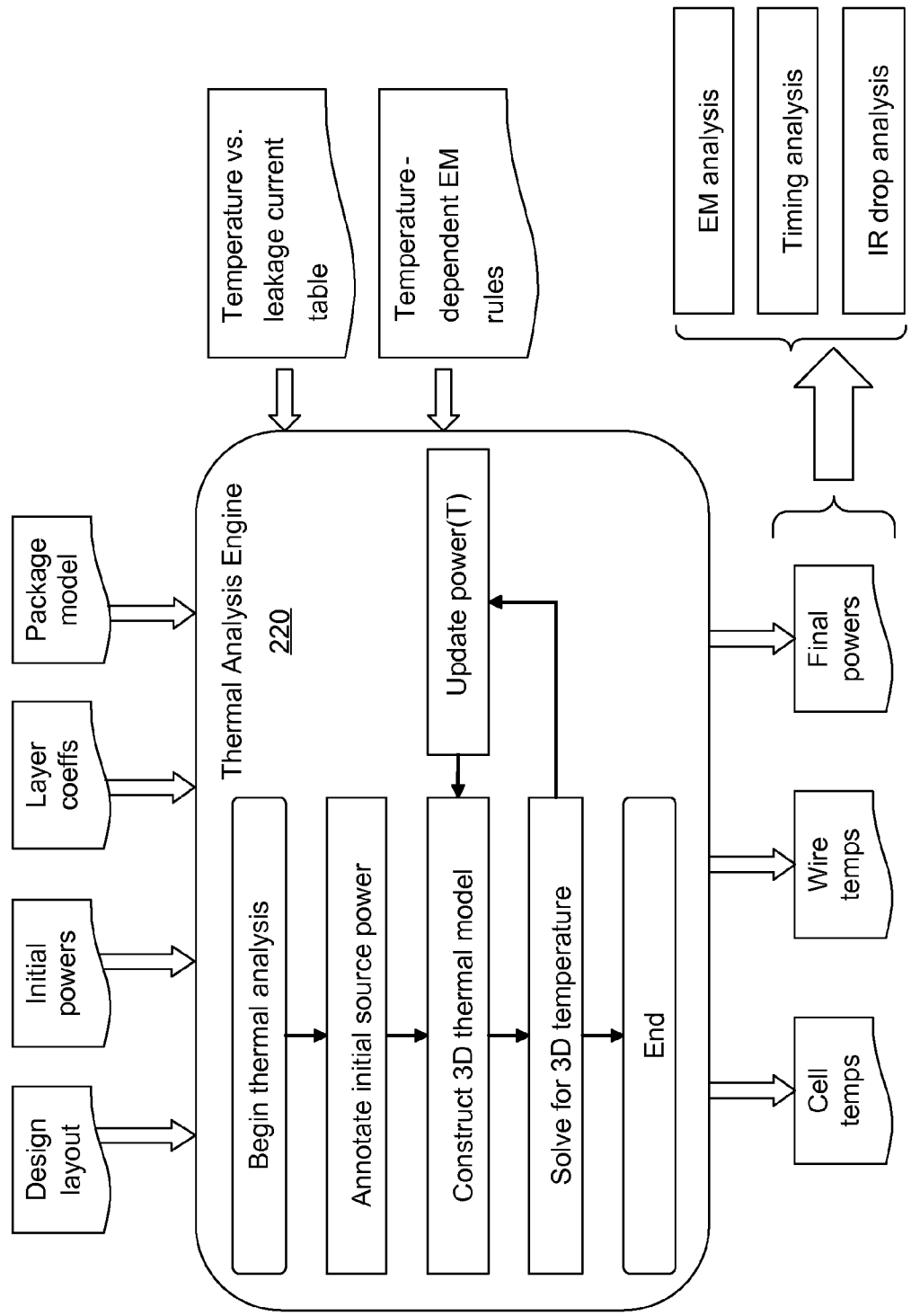
FIGS. 6A and 6B illustrate selected details of the thermal analysis engine of FIG. 5.

FIG. 6A illustrates the inputs, outputs, and internal actions of the thermal analysis engine of FIG. 5. An initial power estimate is derived and a three dimensional thermal model of the chip is constructed from the design layout, layer thermal coefficients, and a thermal model of the package. The thermal model is then used to solve for the temperature of the cells and wires of the chip in three dimensions. The calculated chip temperatures are then used to refine the power estimate. As suggested by the inner loop, the process repeats until the calculated chip temperature settles to a final value. The final power calculation is subsequently passed to electromigration analysis, timing analysis, and IR drop analysis tools to check for problems warranting improvement or repair.

Figure 6B:
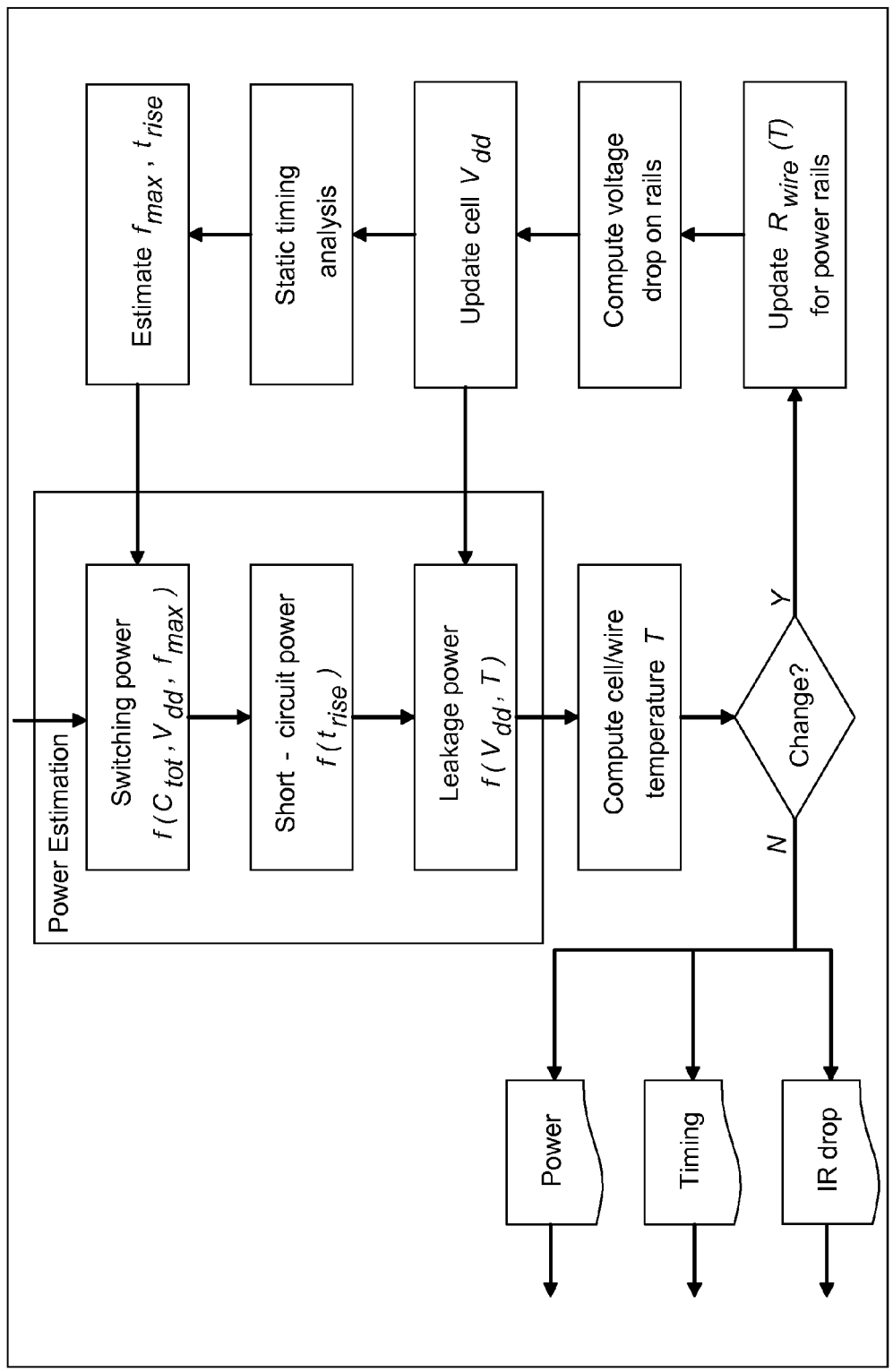

FIG. 6B provides greater detail of the inner loop of the thermal analysis engine. The thermal model is used to compute the cell and wire temperatures from the current power value. As suggested by the decision block at the bottom center, as long as changes in the computed cell and wire temperatures have not settled out, the leakage and switching power are iteratively recalculated as a function of the updated temperature. The loop is exited and the iteration stops once the computed cell and wire temperatures settle out.

Figure 7:
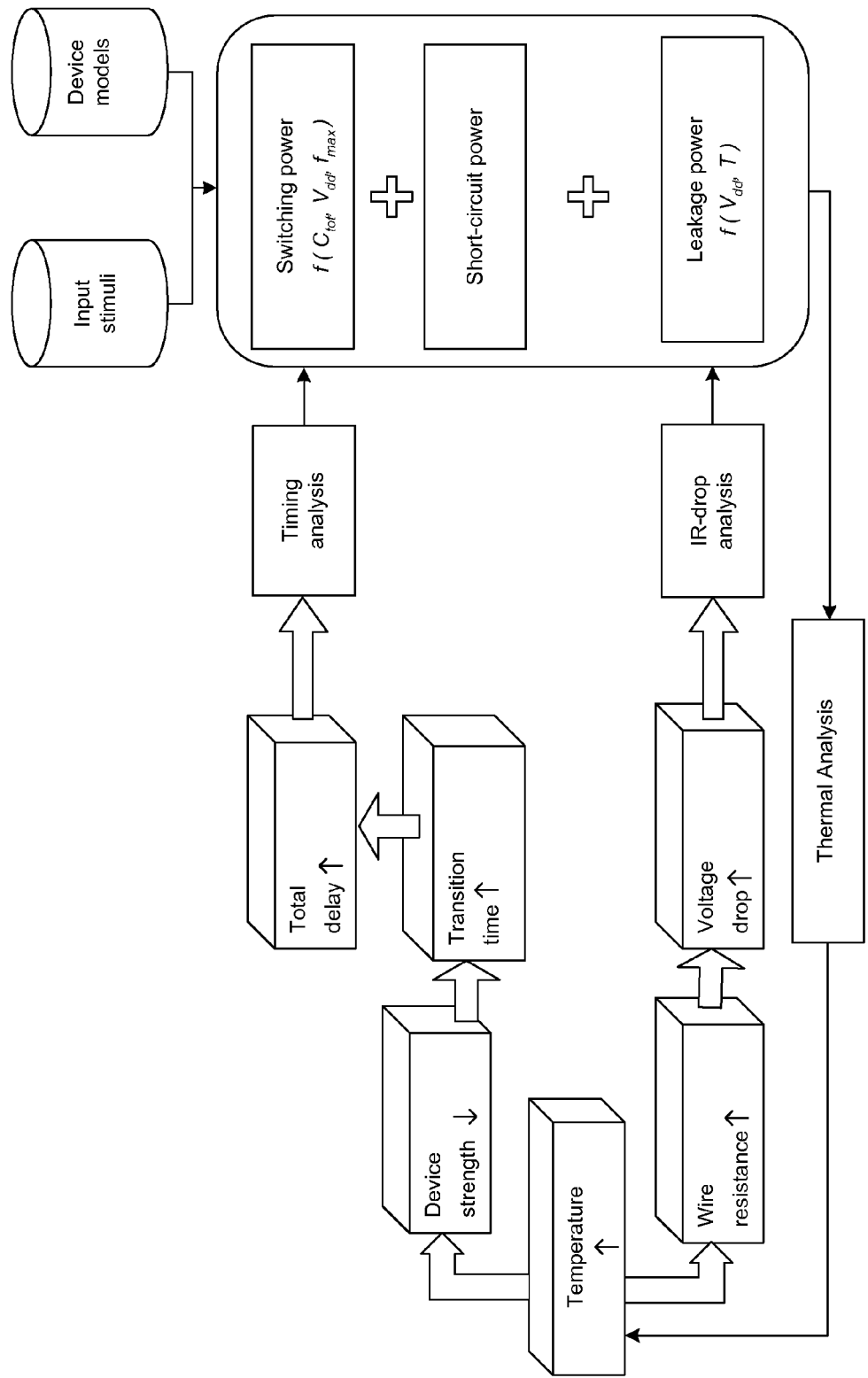
FIG. 7 illustrates an embodiment of temperature aware power analysis.

FIG. 7 revisits the power calculation loop of FIG. 6B from a different perspective and provides insight as to how the computed temperature data affects the power calculation components. The Thermal Analysis engine generates the temperature data. Starting with an initial power estimate of the power sources in the channel layer (corresponding to the current carrying channel layer of the active devices) and the layout information for the chip, the engine then computes the temperature as a function of the power dissipated per unit volume within the chip. The position and geometry of the placed instances are needed to determine the power source models and interactions thereof. The boundary conditions at the power source locations, interlayer dielectric interfaces, metal layers and the package boundary interface are used in numerically solving for the temperature values within the chip. The temperature data per instance and metal shape is used to update the power distribution. Iteratively solving the electro-thermal effects produces the steady-state solution to the temperature distributions. If there are any thermal runaway conditions, then that is also detected through the electro-thermal solution of the chip temperature distribution. The engine is both high capacity and high performance to cope with large-scale designs, and design analysis with several power consumption scenarios.

The initial power of the instances is used as the starting point, and the thermal analysis then electro-thermally computes the steady state power and temperature for the entire chip in three dimensions. The temperature data is used to derive the actual voltage drop and leakage current and then to update the power and the Joule heating in the wires and the corresponding resistivity changes. The steady state temperature is used to compute the actual device drive strength and delays, and then to annotate the local incremental delay (as in SDF) into the static timer. The resultant slew and delay values are used to re-compute the short circuit power and dynamic power with altered effective load capacitance.

Power analysis is applied in the post physical synthesis phase when the instance positions are known and the individual switching information and output load is available.

Figure 8:
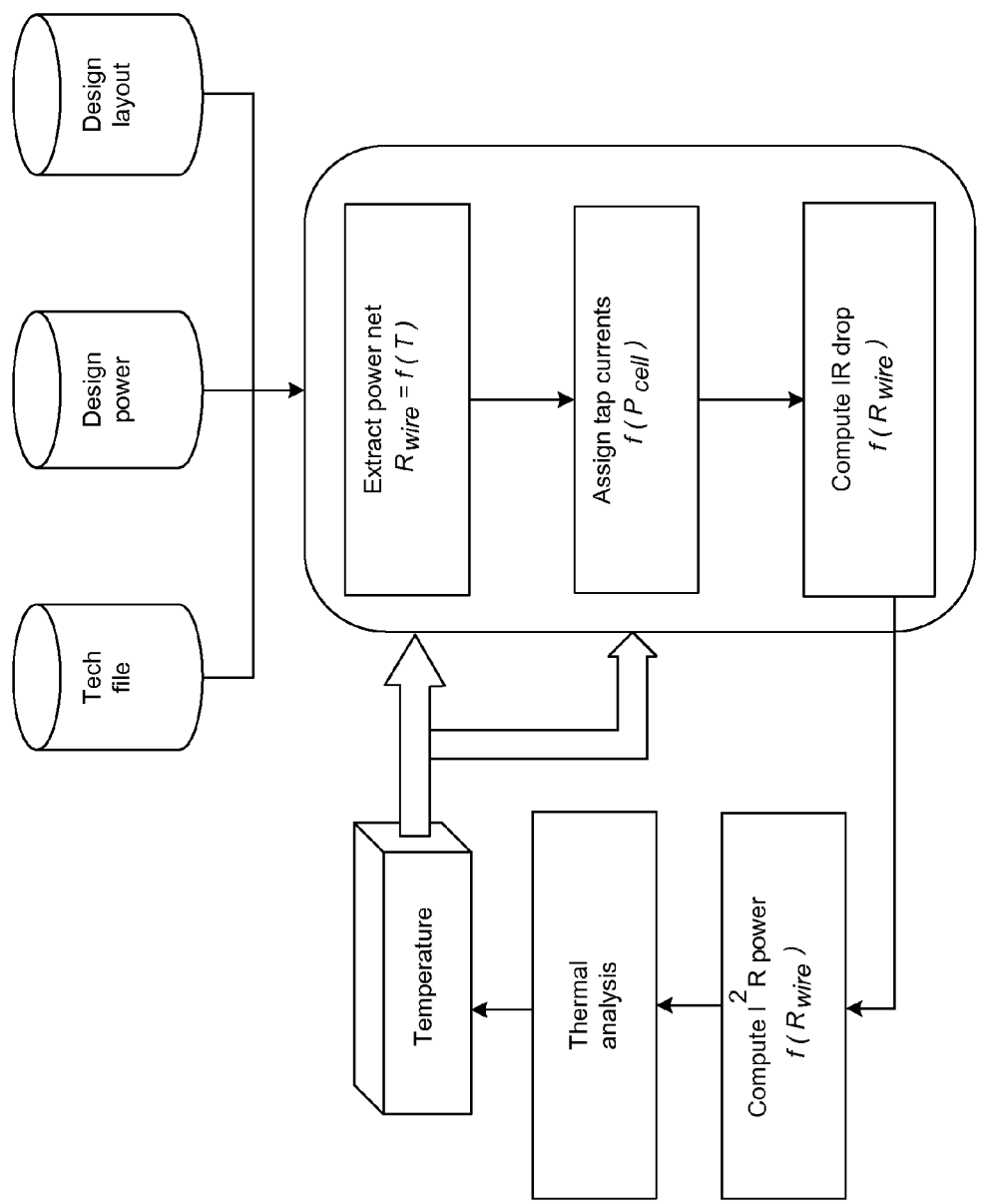
FIG. 8 illustrates an embodiment of temperature aware voltage drop analysis.

A technique for temperature-aware voltage-drop and electromigration checks uses the thermal analysis engine described previously. The incremental changes caused by temperature difference between actual versus average temperature are considered with respect to the wire current density. The changes are due to the incremental changes in device current and wire resistances. Both the voltage drop and the current density are then compared against respective design limits (that are temperature-dependent as well). The temperature dependent leakage current and current density rules are established by working with the semiconductor manufacturers targeted for the fabrication of the respective designs. FIG. 8 illustrates a temperature-aware voltage drop flow.

The temperature-aware power values derived in FIG. 7 are used in obtaining temperature-aware device currents. The current values are used to derive the wire temperature due to self-heating of the wires, and the temperatures of the wire segments are used in changing the resistance of the power bus.

The flow is applicable following the physical synthesis and post power bus routing. The flow is intended for use at physical design planning time and after the detailed routing process for final verification.

Figure 9:
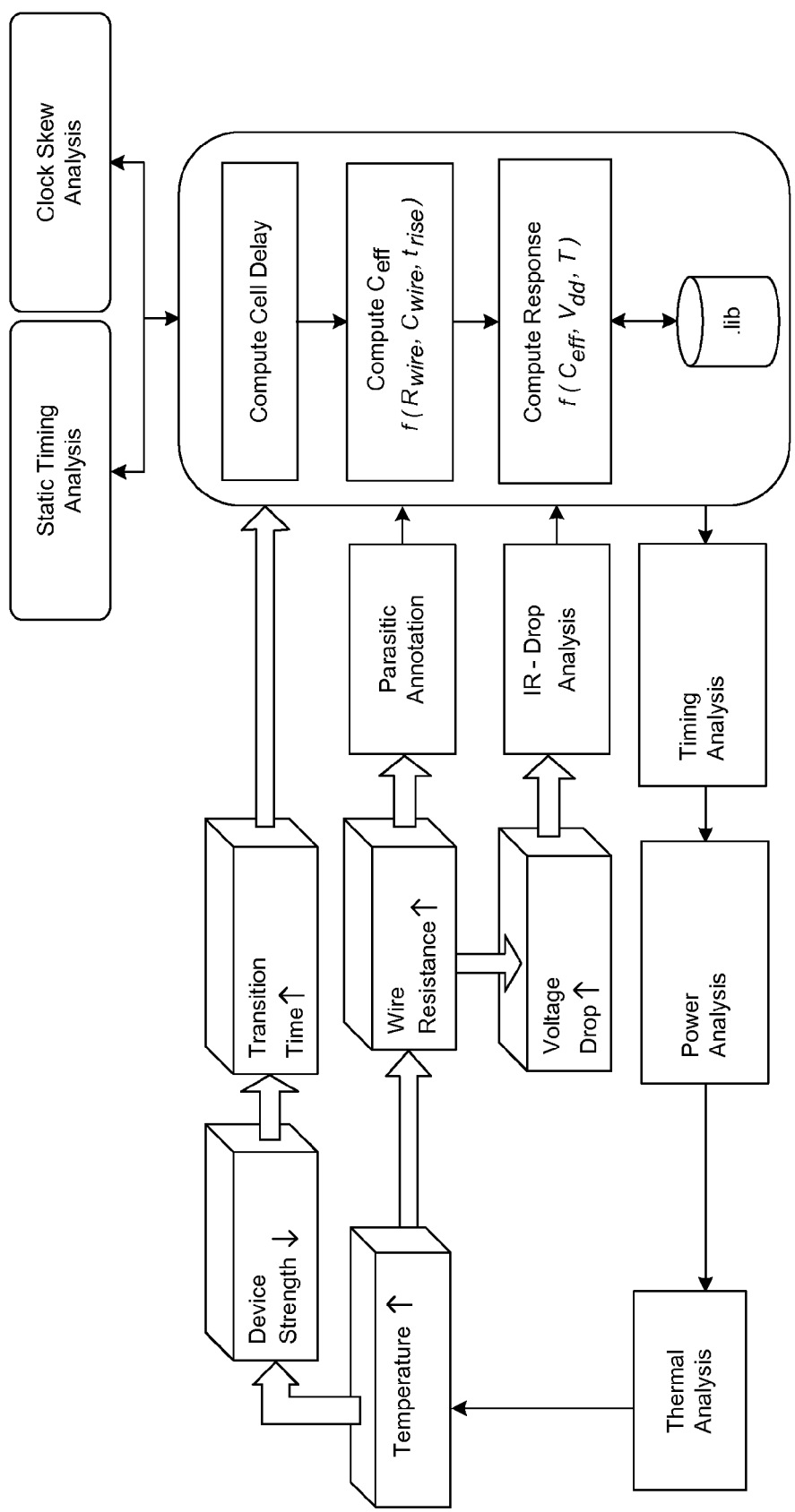
FIG. 9 illustrates an embodiment of temperature aware timing analysis.

FIG. 9 illustrates a temperature-aware timing analysis flow. Parasitic extraction and delay calculation are done in two passes. In a first pass, parasitics and delays are calculated at the average temperature condition of the chip. In a second pass, interconnect resistance and cell delays are scaled based on the thermal gradients. The standard parasitic (SPEF) and delay (SDF) formats are used in the illustrated flow. Thus, existing tools and techniques for the calculation of timing and signal integrity are leveraged. The overhead of post-processing SPEF and SDF files to include the thermal effects is small compared to the overall analysis time. The output from the tool is the incremental delay due to the difference in the average temperature versus the actual device temperature and the signal wire temperature profile. The result is expressed in the incremental SDF format for direct use by static timing analysis tools.

The flow is usable directly after routing of clock and signal nets in the physical design processes and in the final routing stages when the coupling capacitance and signal integrity effects are available for inclusion. In some usage scenarios, integrating temperature aware capabilities into existing design flows is used instead of a so-called "golden analysis" standards. Instead, through the use of tools that incrementally retrofit existing flows with temperature aware data, the temperature effects are fully accounted for.

By applying thermal analysis, pessimism and/or risk associated with the assumption of a uniform on-chip temperature is reduced. In some usage scenarios, a temperature-aware design flow is useful for existing technologies down to 90 nm, and, in other usage scenarios, is required for technologies below 90 nm. The next section addresses the methodology for repairing the issues that arise, in some usage scenarios, because of temperature gradients within the chip.

Thermal Integrity: Analysis and Repairing of Temperature Induced Problems

In this section the thermal analysis of the previous section and repair strategies for addressing thermally induced chip design issues are combined to provide a complete solution for modern day chip designs.

The foregoing description pointed out that the thermal analysis requires the placed instances and bounding boxes. The instances are represented, in some embodiments, as power sources with different levels of granularity (such as transistor, cell, macro, or block). The thermal conduction through metal layers is either estimated or alternatively more accurately calculated depending on the details of the routed geometries. The analysis with coarse granularity and estimated thermal conduction though metal layers corresponds to a floorplan scenario, whereas the detailed analysis corresponds to a post-route scenario.

Assuming an IC comprising several million standard cells, in some usage scenarios, thermal analysis for the floorplan scenario is performed in roughly an hour. The analysis is fast enough to enable floorplan and placement iterations with the goal of avoiding undesirable effects due to thermal gradient. The detailed analysis for the post-route scenario of the same circuit takes much longer, in some usage scenarios. While the analysis at the floorplan stage is accurate enough to find the location and the relative magnitude of thermal hot spots, the post-route analysis enables the designer to verify timing and signal integrity with greater accuracy and therefore reduce pessimistic design margins. It is possible, and in some usage scenarios desirable, to use non-worst-case margins to enable the temperature-aware design flow to identify any resulting issues (that are then fixed individually). In some usage scenarios, the use of non-worst-case margins is beneficial for cost-sensitive applications where overly-conservative margin left in the design corresponds to increased silicon area.

The analysis data at the early stages is useful, in some usage scenarios, in removing hot spots and in equalizing the temperature distribution. Consequently, subsequent processing occurs with progressively less steep thermal gradients. In some usage scenarios, the less steep gradients enable standard CAD tools with internal analysis capability to operate closer to the constant temperature premise, enabling existing optimization and analysis algorithms to be applicable. The temperature profile and the distance of the power source from the surrounding temperature contours are input to cost functions used to determine several placement options for a given temperature gradient tolerance. The package characteristics are taken into account to ensure realistic temperature contours.

Figure 10:
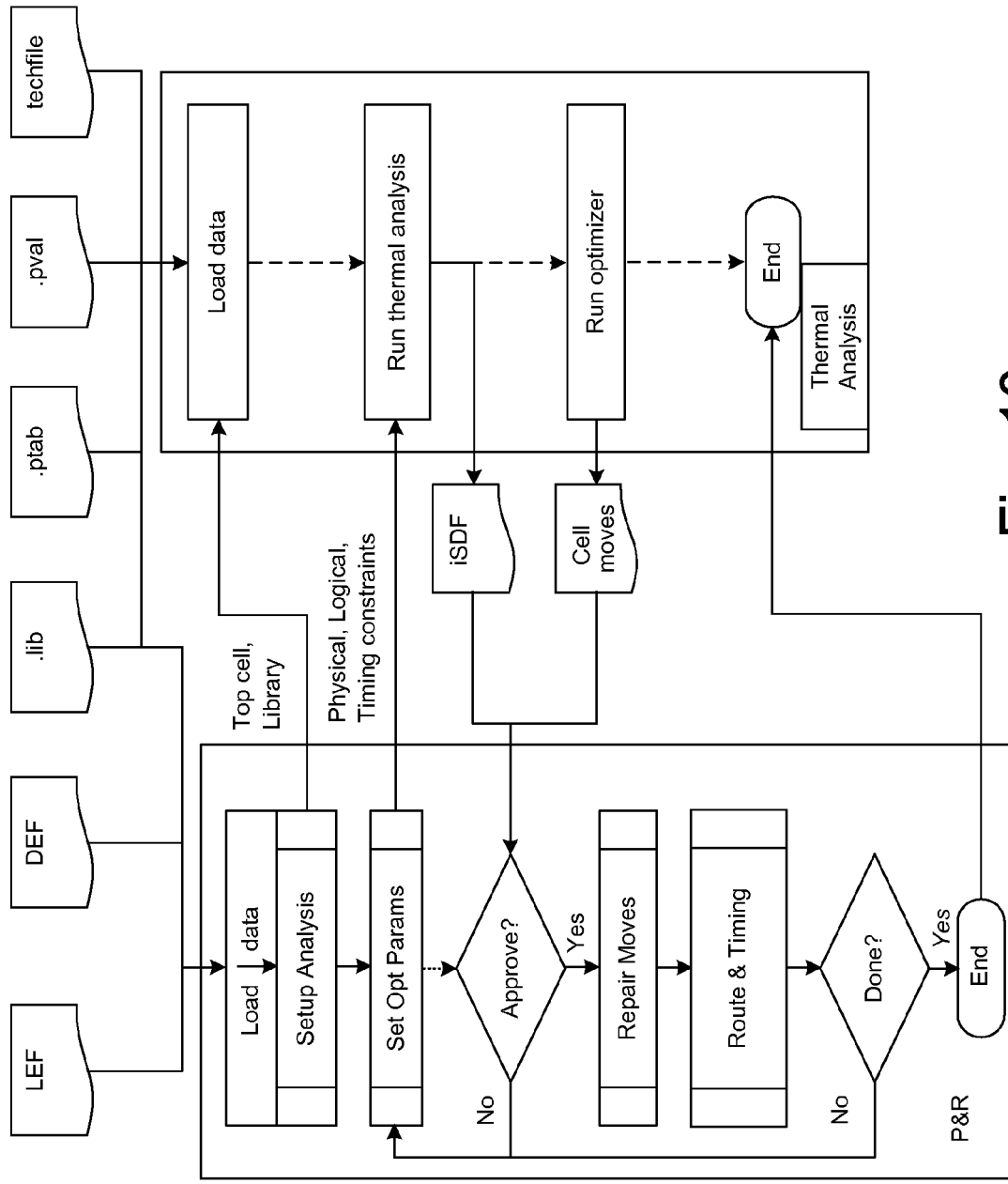
FIG. 10 illustrates an example flow for temperature aware cell placement.

An example flow of a temperature driven cell placement is illustrated in FIG. 10. The thermal analysis function is called from within the physical design tool (such as a P&R tool) to initiate temperature calculations and to obtain information on possible cell moves that would minimize the temperature gradients within the chip. The thermal analyzer identifies cell instances and moves that best optimize the temperature gradients under the given constraints. The analyzer then sends the location and move request to P&R for approval. The loop iterates with further constraint data to check if there are any violations in P&R until an approval is signaled to the thermal analysis tool. Then the temperature-aware cell moves are implemented by P&R.

The ptab input file contains instance positions passed to the thermal tool by the physical CAD tool. The pval input file contains instance power values given to the thermal analysis tool from a power estimation tool (integrated, in some usage scenarios, with the P&R tool). The techfile input file contains layer dimensions, material constants, package characteristics and ambient temperature information.

Parasitic information and static timing analysis results are available through P&R and temperature aware delay calculation is available within the thermal analysis tool similar to the flow described in FIG. 9.

After the final routing and temperature aware timing analysis is completed, if there are any more temperature hot spots, then the thermal analysis tool applies further repair actions using thermal structures to further minimize temperature gradients, and the flow is then completed with the optimal temperature distribution for the given design and package parameters.

Figure 11:
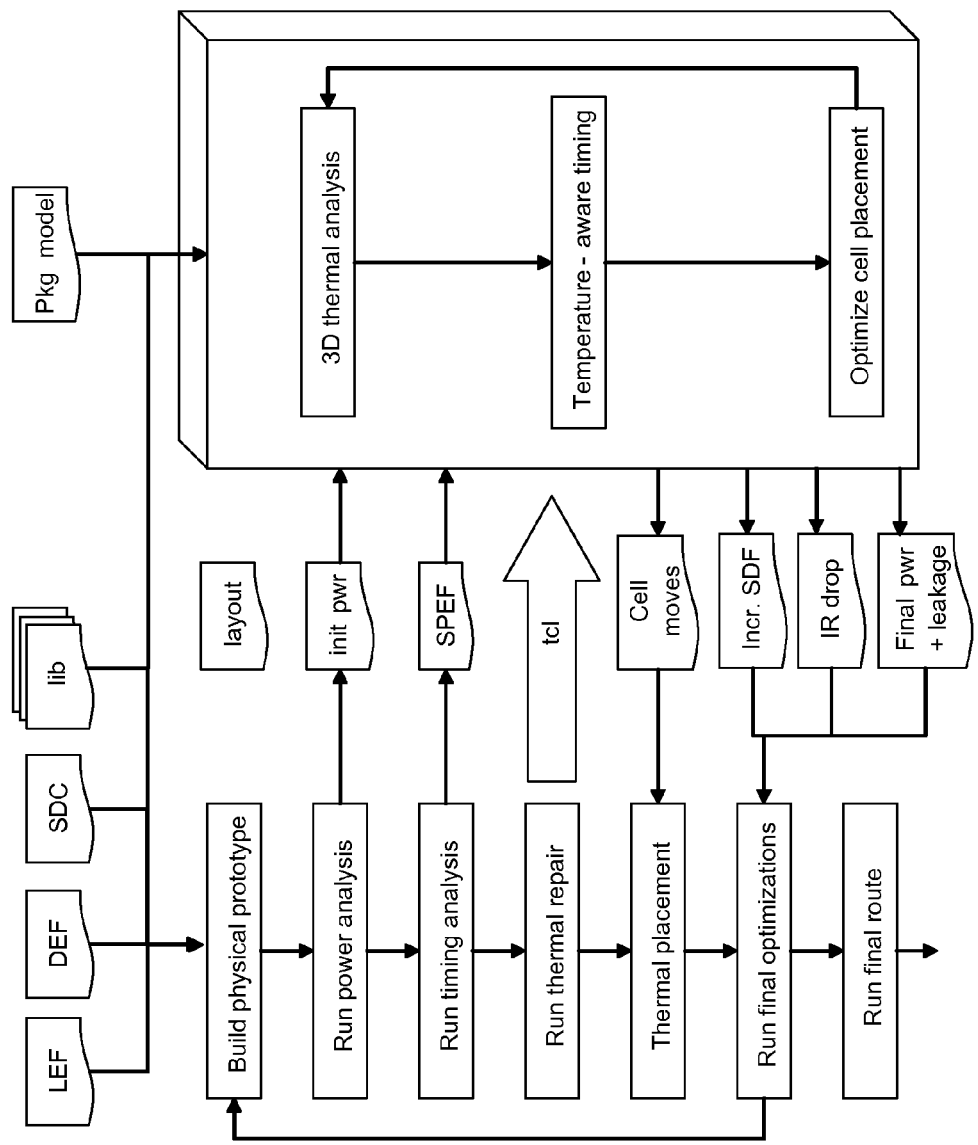
FIG. 11 illustrates another example flow for temperature aware cell placement.

FIG. 11 is an alternative perspective of the example flow for temperature aware cell placement of FIG. 10, drawn to emphasize the various data types passed by the thermal analysis engine.

Design Improvement Flow

Figure 12:
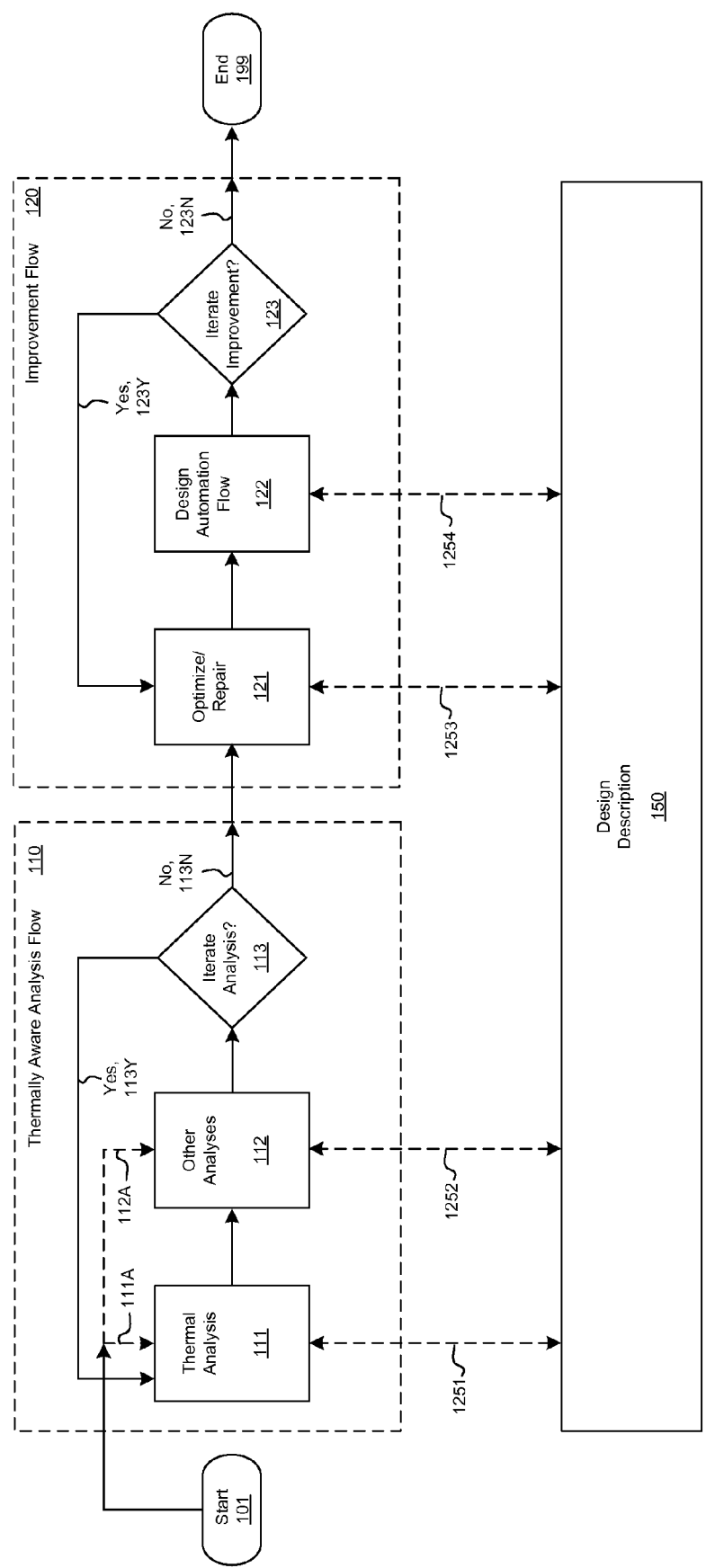
FIG. 12 illustrates an embodiment of a flow diagram for improving electronic component design by incorporating thermally aware analysis.

FIG. 12 illustrates an embodiment of a flow diagram for improving electronic component design by incorporating thermally aware analysis. As illustrated in the figure, in some embodiments the flow includes two phases. A first phase includes an iterative analysis of the electronic component accounting for thermal effects ("Thermally Aware Analysis Flow" 110). A second phase includes an iterative improvement of the design of the component ("Improvement Flow" 120), using information from the thermally aware analysis.

"Design Description" 150 is a collection of information defining various aspects of the particulars of the specifications for manufacturing and using the electronic component that is to be improved, including logical, physical, and mechanical descriptive data. In some usage scenarios, the electronic component is an IC that includes any combination of one or more monolithic die, a package for the die, an attachment mechanism to couple (electrically and mechanically) the die to the package, and heat dissipation elements. In some embodiments, the description is in the form of computer-readable files including any combination of a technology file, an extracted parasitic netlist file, timing constraints files, device and interconnect information files (such as geometry, orientation, and location information files), and average power files (from simulation or designer input). "Thermally Aware Analysis Flow" 110 and "Improvement Flow" 120, each with iterative processing, optionally communicate information between each other and internal elements via the description, as illustrated conceptually by dashed-arrows 1251-1254, according to various embodiments.

More specifically as illustrated by the figure, flow beings ("Start" 101) and an analysis of the electronic component is performed, accounting for thermal properties and resultant behaviors ("Thermally Aware Analysis Flow" 110), with optional iterations. Results of the thermal analysis include expected operating temperatures (absolute or gradient) for various portions of the electronic component, including any combination of the die, the package, the die attach mechanism, and the optional heat sink.

Subsequently the electronic component design is improved ("Improvement Flow" 120), using information from the thermally aware analysis flow, also with optional iterations. Flow is then complete ("End" 199). The entire illustrated flow, from the start to the end, is optionally repeated as desired, under the direct control of design personnel or programmatically, according to embodiment.

The thermally aware analysis flow begins by analyzing or simulating the thermal behavior of the electronic component design ("Thermal Analysis" 111), based in part on portions of "Design Description" 150. Output results include expected operating temperatures for various elements of the die, including various devices and interconnect. The results optionally also include a thermal diagram or temperature gradient map, indicating equi-thermal lines of identical temperature superimposed on a representation of the physical or mechanical layout of portions of the electronic component. Alternatively, a listing of elements and respective temperatures is provided in a tabular format. Various combinations of the results are provided, in various embodiments, in human-readable and computer-readable representations.

Processing then proceeds with analyses according to procedures, in some embodiments, relying on the operating temperatures of the various elements as inputs ("Other Analyses" 112). In other words, the other analyses use temperature information provided by the thermal analysis to perform other operations, varying by embodiment and including circuit and logic simulation, as well as STA. The other analyses further include signal integrity analyses, leakage current checking, and electrical rules checking. In some embodiments, the circuit simulation is performed via any combination of industry standard tools such as SPICE, HSPICE, and HSIM. In some embodiments, the logic simulation is performed via an industry standard Verilog compatible simulator. In some embodiments, the STA is performed via an industry standard tool such as PrimeTime. Varying by embodiment, the signal integrity analyses include analyzing data signals, clock lines, and power grids, often using industry standard tools such as VoltageStorm and CeltIC. The electrical rules checking includes any combination of slew rate, current density, and electromigration checking, according to various embodiments.

After completing the other analyses, it is determined if additional thermal and other analyses are required ("Iterate Analysis" 113). If additional iterations are required ("Yes" 113Y), such as due to results of the other analyses indicating heat output from devices that is different than what was assumed prior to the thermal analysis, then flow returns to "Thermal Analysis" 111. If additional iterations are not required ("No" 113N), then the thermally aware analysis flow is complete, and flow continues, using the results of the analysis to improve the design ("Optimize/Repair" 121).

The optimize/repair processing examines the results of the thermal and other analyses to determine ways to improve the design of the electronic component. Improvements take the form of any combination of optimizations, repairs, and similar techniques to enable better performance of an instance of the electronic component manufactured according to portions of "Design Description" 150. Examples of selected improvement techniques are described elsewhere herein (see the "Example Improvement Techniques" section). Outputs of "Optimize/Repair" 121 include any combination of violation reports for inspection by design personnel, ECO scripts for input to design automation tools, and similar data for improving the design of the electronic component, according to various embodiments.

In some embodiments, the ECOs are passed programmatically directly for use by "Design Automation Flow" 122. In some embodiments, design personnel inspect the ECOs and selectively pass all or portions of them to the design automation flow. Some embodiments of the design automation flow include operation of one or more industry standard (or industry standard compatible) CAD tools using as input at least the ECOs and selected information from "Design Description" 150. The CAD tools include any combination of logic synthesizers, netlist generators, place and route tools, layout extractors, and other similar elements to develop aspects of the logical and physical implementation of the electronic component.

After completion of the design automation flow, it is determined if optimization/repair and design flow operations are necessary ("Iterate Improvement?" 123). If additional iterations are required ("Yes" 123Y), such as due to not meeting some of the optimize/repair specifications, then flow returns to "Optimize/Repair" 121. If additional iterations are not needed, then the improvement flow is complete, and flow continues via "No" 123N to "End" 199. In various embodiments, checking for the need for additional operations ("Iterate Improvement?" 123) is performed by design personnel, design programs, or both.

In some embodiments, "Thermal Analysis" 111 provides thermal information to "Other Analyses" 112 via modifications to models referenced by the other analyses. For example, timing delay models used by an STA executed during the other analyses is modified by the thermal analysis to reflect effects of operating temperatures (in some usage scenarios, hotter devices have longer propagation times while cooler devices have shorter propagation times). Similarly, power models read by a power grid analyzer is modified according to results of the thermal analysis (in some usage scenarios, hotter transistors have higher leakage currents and cooler transistors have lower leakage currents). As another example, interconnect properties used by an electromigration checking tool are modified based on temperatures of operation of interconnects determined by the thermal analysis (higher temperatures, in some usage scenarios, being modeled as resulting in greater susceptibility to electromigration effects).

In some embodiments, "Thermal Analysis" 111 provides thermal information to "Other Analyses" 112 via differential (or incremental) parameter changes with respect to a fixed operating temperature point, conceptually similar to a "small-signal analysis" around the temperature point. In some embodiments, elements of "Other Analyses" 112 (such as analyzers for timing, voltage drop, power, electromigration, and noise) perform an analysis at an assumed constant temperature (one of minimum, maximum, or nominal, for example). In other words, the analysis is performed as if all of the analyzed elements operated at the same temperature. However, results of the thermal analysis. in some usage scenarios, indicate operation of the analyzed elements at varying temperatures. In some of the fixed-temperature analysis CAD contexts, "Thermal Analysis" 111 provides incremental data to facilitate a more accurate analysis that accounts for the determined temperature gradients.

Several illustrative examples serve to further describe the incremental analysis technique, as follows. The thermal analysis provides the timing analyzer with incremental delay information based on computed temperature variations. The incremental delays represent differences in propagation behavior between operation at the assumed temperature point and the temperature point determined by the thermal analysis. The voltage drop analyzer is provided with differential voltage drop information computed in accordance with the thermal analysis. The power analyzer is provided power variance information as relating to variation of leakage power with respect to the temperatures provided by the thermal analysis. The electromigration analyzer rule check is modified according to differences (above or below) assumed temperature operation of interconnect (signal, clock, supply, and so forth) according to thermal analysis results, including more stringent rules for elevated temperatures and correspondingly more relaxed rules for reduced temperatures. The noise analyzer is provided with information regarding signal waveform variation as a function of temperature according to the thermal analysis, the variation being obtained by a technique such as annotations of temperature variation in a circuit simulation.

In some embodiments, portions of "Other Analyses" 112 are incorporated into "Thermal Analysis" 111, optionally including iterations similar to "Iterate Analysis" 113. For example, an iterative logic/timing simulation is performed that dynamically accounts for operating temperatures of various devices of the electronic component by accounting for localized heat generation due to dynamic switching activity. Similarly, a power grid analysis is performed that feeds back power estimation information to an incorporated/integrated thermal analysis to determine new operating temperatures for devices. In turn thermal analysis results are input to a revised power grid analysis.

In some embodiments, "Optimize/Repair" 121 relies on information from "Other Analyses" 112. For example, an optimization or a repair otherwise introduces a new timing problem or creates a design rule violation. The optimize/repair processing instead selects a strategy based on any combination of the thermal analysis and the other analyses to avoid introducing new errors.

As illustrated, the thermally aware analysis is not restricted to beginning with a thermal analysis (dashed-arrow 111A). Instead processing alternatively begins with other analyses (dashed-arrow 112A), under control of design personnel directives, programmatic selection, other determination schemes, or according to various embodiments. For example, in some embodiments, it is desirable to perform an initial logic simulation to determine activity factors (or fractional switching duty cycles) in preparation for the thermal analysis. The activity factors are used to provide information regarding heat source behavior, as transistors and interconnect (including resistive, capacitive, and inductive effects), in some usage scenarios, dissipate more power (as heat) when changing state more often. For another example, in some embodiments, it is useful to perform an initial leakage analysis to estimate leakage power (having an exponential temperature dependence) in preparation for the thermal analysis. The leakage estimate is used to provide information regarding heating due to the elements dissipating the leakage power.

EXAMPLE IMPROVEMENT TECHNIQUES

In the following example improvement techniques, each cooling structure (a.k.a., heat removal element) is an abstraction for one or more of the heat dissipation and spreading design choices disclosed throughout this specification (including the claims as filed). To repeat just some of the techniques here: vias, solder bumps, metal fills, final metal pads/lands, wire width, and bond wires, are selectively introduced or modified to dissipate and/or spread heat to reduce, equalize, and/or smooth the temperature distribution in a local area. Likewise, the heating structure (a.k.a. heat source) of the last example is an abstraction for one or more design choices (as described throughout the specification and claims) that result in a temperature increase in the desired local area. For example, a higher R metal is chosen for a wire proximate to the local area, a nearby transistor is resized, or the density of proximate solder bumps or heat sink fins is decreased. Both types of thermal structures (cooling and heating) are furthermore achievable at least in part through the technique of substitution of otherwise functionally interchangeable elements that are differentiated by differences in respective thermal conductivity. That is, the temperature distribution in a local region is modified as desired at least in part by choosing a more appropriate available thermal conductivity type for structures and/or components in the region of interest.

FIG. 13 illustrates an example of a hold time problem recognized by thermally aware analysis (such as performed by "Thermally Aware Analysis Flow" 110 of FIG. 12). Cool Region 1310 includes Source FFs 1311, AND Gate 1312, XNOR Gate 1313, and AND Gate 1314, all operating at a relatively low temperature, as determined by "Thermal Analysis" 111. Hot Region 1320 includes Destination FF 1321 and in close physical proximity, Heat Source 1322, all operating at a relatively high temperature, as determined by "Thermal Analysis" 111. The elements of Cool Region 1310 operate with relatively small delays, due at least in part to relatively low operating temperatures. Destination FF 1321 operates with relatively large delays, due at least in part to a relatively high operating temperature, and the large delays result in the FF requiring a relatively longer hold time to capture an input.

"Thermal Analysis" 111 provides the STA (performed, in some embodiments, as part of "Other Analyses" 112) with information describing the temperature affected relative timing performance between Cool Region 1310 and Hot Region 1320. The timing performance information is explicit or implicit, according to embodiment. Explicit information, in some embodiments, is in the form of delay differentials or deltas, with respect to an assumed temperature operating point used by the STA. Implicit information, in some embodiments, is in the form of absolute or differential temperatures used by the STA to compute delay times accounting for temperature gradients. The STA recognizes that due to the relatively small delay of the path through Cool Region 1310, in conjunction with the relatively longer hold time requirement of Destination FF 1321, that there is a hold time problem in the path from Source FFs 1311 to Destination FF 1321. The detected hold time violation occurs under the conditions of the temperature gradient recognized by "Thermal Analysis" 111.

FIG. 14 illustrates an example repair technique for the hold time problem of FIG. 13, as provided by thermally aware design improvement (such as performed by "Improvement Flow" 120 of FIG. 12). More specifically, FIG. 14 illustrates improving the hold time performance of Destination FF 1321 by reducing the operating temperature of Destination FF 1321 as a repair for the hold time violation. However, in the example of FIG. 14, a heat removal element is added, via insertion of Cooling Structure 332, in close physical proximity to Destination FF 1321. The elements of FIG. 14 are identical to the elements of FIG. 13, except for the addition of the cooling structure. As illustrated, the area of relatively lower temperature operation (Cool Region 1310C) extends to include Destination FF 1321, due to the addition of the cooling structure. The region of relatively higher temperature operation (Hot Region 1320C) is correspondingly reduced in area. In the example of FIG. 14, "Thermal Analysis" 111 identifies the heat source and "Optimize/Repair" 121 recognizes opportunity for improvement by decreasing the effect of the heat source on the FF by adding the heat removal element.

Figure 15:
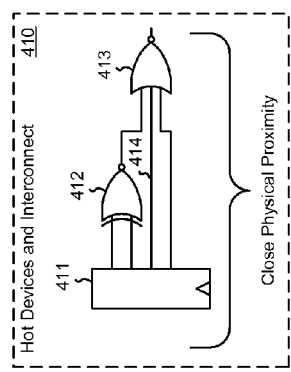
FIG. 15 illustrates an example of performance or reliability problems caused by high operational temperatures as recognized by thermally aware analysis.

FIG. 15 illustrates an example of performance or reliability problems caused by high operational temperatures as recognized by thermally aware analysis (such as performed by "Thermally Aware Analysis Flow" 110 of FIG. 12). Hot Devices and Interconnect 410 includes Source FFs 411, XNOR Gate 412, NOR Gate 413, and Interconnect 414, in close physical proximity and all operating at a relatively high temperature, as determined by "Thermal Analysis" 111. The performance problems due to the elevated temperature, in various usage scenarios, include increased leakage current (from the transistors in the FFs and Gates, for example), reduced current handling capability (in the interconnect, for example), or both. The reliability problems due to the higher temperature include, in various usage scenarios, accelerated electromigration effects such as via damage and wire cracking, in any combination of the FFs, Gates, and interconnect.

In some embodiments, "Thermal Analysis" 111 provides the electrical rules checking tool executed, in some embodiments, as part of "Other Analyses" 112 with temperature profile information for the elements of Hot Devices and Interconnect 410. The electrical rules checker recognizes the performance or reliability problems due to the high temperature operation. In some embodiments, "Thermal Analysis" 111 provides the checking tools with modified rules that take into account operating temperatures of analyzed elements. For example, a rule for checking a power line routed near a large heat generator (and thus operating at a relatively higher temperature) is more stringent than a rule for checking a ground line routed far from heat generators (and thus operating at a relatively lower temperature).

Figure 16:
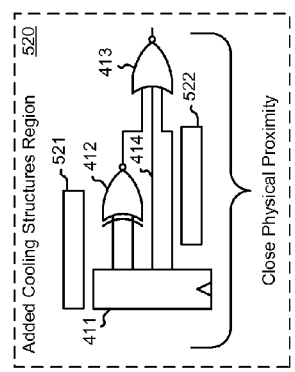
FIG. 16 illustrates an example repair technique for the performance and reliability problems of FIG. 15, as provided by thermally aware design improvement.

FIG. 16 illustrates an example repair techniques for the performance and reliability problems of FIG. 15, as provided by thermally aware design improvement (such as performed by "Improvement Flow" 120 of FIG. 12). More specifically, FIG. 16 illustrates an example for improving the performance and reliability of Hot Devices and Interconnect 410 by insertion of cooling structures to reduce operating temperatures. The elements of FIG. 16, as illustrated by Added Cooling Structures Region 520, are identical to the elements of FIG. 15 except for the addition of heat removal elements Cooling Structure 521 and Cooling Structure 522. The cooling structures decrease operating temperatures and thus effect improved performance and reliability, as in the previous example. Requirements on the nature and location of the heat removal elements are provided by "Optimize/Repair" 121 to "Design Automation Flow" 122 to implement improvements of an electronic component including functionality as specified by Hot Devices and Interconnect 410.

Figure 17A:
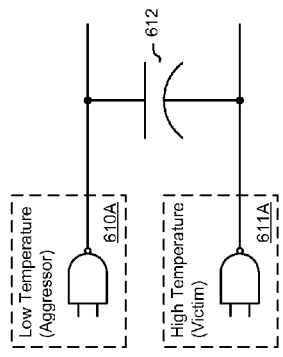
FIG. 17A illustrates an example of a noise problem brought about in part by a steep thermal gradient that is recognized by thermally aware analysis.

FIG. 17A illustrates an example of a noise problem brought about in part by a steep thermal gradient that is recognized by thermally aware analysis (such as performed by "Thermally Aware Analysis Flow" 110 of FIG. 12). Low Temperature (Aggressor) 610A affects High Temperature (Victim) 611A via Coupling Capacitance 612. In a failure mode, as the Victim output is being sampled by a storage element, the Aggressor switches at a high slew rate, coupling a transient to the Victim output and causing a sampling error. The error is magnified by the thermal gradient, as the Aggressor slews more quickly due to operation at a relatively low temperature, while the Victim recovery slew rate is slower due to operation at a relatively high temperature. In some embodiments, temperature profiles, as determined by "Thermal Analysis" 111 and provided to the noise analysis performed by "Other Analyses" 112 enable detection of the noise problem. In some embodiments, temperature aware noise behavior information is provided directly by the thermal analysis to the noise analysis.

Figure 17B:
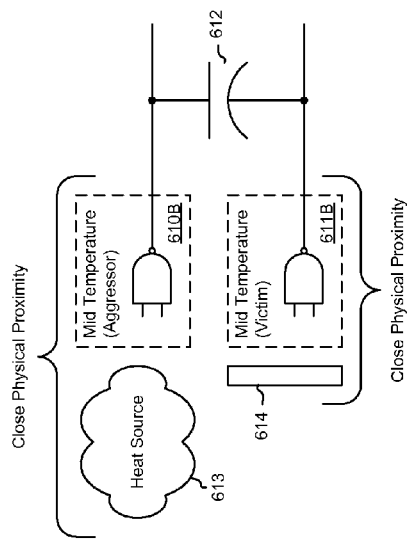
FIG. 17B illustrates an example improvement technique for the noise problem of FIG. 17A, as provided by thermally aware design improvement.

FIG. 17B illustrates an example improvement technique for the noise problem of FIG. 17A, as provided by thermally aware design improvement (such as performed by "Improvement Flow" 120 of FIG. 12). Two mechanisms are illustrated, usable alone or in combination. A first mechanism includes addition of Heat Source 613 near the Aggressor, resulting in operation at a relatively higher temperature, as illustrated conceptually by Mid Temperature (Aggressor) 610B. A second mechanism includes addition of Cooling Structure 614 near the Victim, resulting in operation at a relatively lower temperature, as illustrated conceptually by Mid Temperature (Victim) 611B. The two techniques tend to reduce the thermal gradient (i.e. provide a more nearly uniform temperature distribution) between the Aggressor and the Victim, thus reducing the relative effect of the Aggressor on the Victim, and the noise problem is mitigated, improving the design. Computations in "Optimize/Repair" 121 and corresponding results provided to "Design Automation Flow" 122 include any combination of heat source selection and placement, as well as cooling structure selection and placement, according to various embodiments.

Adaptive 3D Grid Analysis

Spatial distribution of steady-state temperature due to a set of power sources situated in an infinite plane is modeled by computing the temperature profile of each source individually and then summing up the result. Application of the same principle to a semiconductor IC requires the individual temperature profiles to be computed within the confines of the chip boundaries and the different material interfaces that surround the power sources in all three directions. Solving for steady state temperatures within the IC, in some usage scenarios, involves billions of power sources (active devices, interconnect and poly resistors) while maintaining boundary conditions at a large number of interfaces (package, inter layer dielectric, bond pads, power bumps etc.). Various mathematical schemes (algebraic, finite difference, finite element, boundary element, multi-grid, and integral techniques) have been developed for the solving. To achieve accurate and runtime efficient computational schemes it is useful, in some usage scenarios, to build effective models of the heat transfer mechanisms within the IC so the mathematical operators are meaningfully and efficiently used.

Grid based solutions are used in several applications and various references are available describing grid based techniques. The choice of the grid strongly influences the runtime, resolution, efficiency, convergence and the accuracy of the grid based simulations and therefore needs careful consideration. An overly fine grid, in some usage scenarios, results in excessive computational waste and unnecessarily long runtimes. Conversely, an overly coarse grid, in some usage scenarios, results in poor convergence, accuracy, and resolution. Inhomogeneity within the volume being simulated complicates the grid selection.

Timely and accurate convergence of the heat equations for both steady state and transient temperature analysis is achieved through use of locally-specific grid spacing. That is, instead of using a uniform global grid with the same size throughout the IC, the grid size (spacing between grid points) is varied in each of the X, Y, and Z dimensions based on one or more preselected criteria. The selected criteria include local and global conditions of the IC being simulated and meta conditions of the simulation proper. The criteria optionally further selectively dictate that the spacing in one or more of the physical dimensions be changed from iteration to iteration.

A discretization approach effectively models semiconductor IC temperature distributions using heuristics to adaptively grid the space in 3D and simultaneously apply (heat equation) mathematical operators to solve for temperatures within the grid points. Adaptive and locally variable grid spacing techniques are used so that the mathematics converge efficiently and accurately for steady state and/or transient temperature solutions. The grid is variably spaced selectively and independently in each of the coordinate (X, Y, and Z) dimensions. The grid is further selectively varying from iteration to iteration. The resolution of the grid is thus locally adapted (the spacing between grid points is locally varied) as dictated by local conditions in time (iteration space) and space (the three physical dimensions) to optimize predetermined simulation performance criteria. In some embodiments, selectively varying the grid permits lower resolution to be broadly used (yielding shorter run-times) while simultaneously selectively using higher resolution (to provide locally greater accuracy) as a function of local conditions (in time and space).

In a first grid-topology aspect, the localized grid size is a function of localized rates of change (spatial and temporal) in at least some of the simulated thermally significant variables. Furthermore, as the simulation progresses, the localized grid size is recomputed based on the local thermal behavior. Thus, resolution is selectively automatically adapted to better model regions of higher gradients. In some embodiments, the resolution within regions of relatively higher gradients is selectively greater than the resolution elsewhere. Similarly, for transient thermal analysis, temporal rates have analogous split functions that enable fine-versus coarse-level analysis that overlay the spatial grid.

In a second grid-topology aspect, grid boundaries are selectively defined between IC materials having differing thermal conductance and the localized grid size (a.k.a. spacing, granularity) is a function of at least some of the design variables and material characteristics as they are locally applied. Thus, grid placement and spacing is selectively automatically adapted to better model boundary effects. In some embodiments, for at least portions of the simulation, the grid resolution proximate to material boundaries is selectively greater than the resolution elsewhere.

In a third grid-topology aspect, based on convergence information obtained as the simulation progresses, the grid size over the iterations of the simulation is globally modified (or a grid adaptation otherwise in accordance with the other aspects is modified) in accordance with predetermined global simulation performance criteria (or strategy). In some embodiments, the grid is selectively globally adapted over time (more specifically, over subsequent iterations) to minimize the simulation run-time consistent with maintaining a simulation accuracy requirement. That is, as the simulation progresses through the iteration sequence, the grid size is repeatedly recomputed with a bias toward relaxation (greater spacing) consistent with keeping errors below a predetermined maximum.

Note that while the grid is recomputed as the simulation progresses in both the first and third aspects, the motivation for the recomputation is fundamentally different. In the first aspect, the recomputation is done to refine the local grid spacing in view of updated values for the rates of change of the local thermal variables. In the second aspect, the recomputation is done to bias the global grid spacing to execute a predetermined simulation performance strategy in view of the relative progress of the simulation. The above described grid-topology aspects are not mutually exclusive, and some embodiments use more than one of the aspects.

Steady-State and Transient Analysis Strategies

The variable grid approach described herein is flexible, and usable for thermal analysis in any of a wide variety of ways, such as:
(a) performing both transient analysis and steady-state thermal analysis on different portions of the same design;
(b) performing transient analysis followed by steady-state analysis at different times on the whole chip;
(c) performing steady state thermal analysis only;
(d) performing transient thermal analysis only; or
(e) performing other combinations of thermal analysis on other combinations of all or portions of a design and/or a chip.

Thermal Time Constants for Transient Analysis

In transient heat transfer solutions, thermal time constants are the analog of electrical time constants, being the product of thermal resistance and thermal capacitance. The thermal resistance of a component is proportional to the length of the medium (extracted within each grid), inversely proportional to cross sectional area perpendicular to the direction of the heat flow, and inversely proportional to the thermal conductivity. Thermal capacitance is extracted from grid points to approximate isothermal volumes. The capacitance is a product of the mass of the element (the element volume contained within the grid as a consequence of the split function) and the specific heat of the medium the heat transfer occurs through.

Local Grid Based on Thermally Related Distributions

Several thermally related distributions of an IC (such as one or more of temperature, power, and thermal conductivity), in some usage scenarios, have regions that are characterized by the nature of the distribution slope within the region. For example, some of the regions are regions of near zero change, some are convex regions, some are concave regions, and other regions are inflection regions between convex and concave regions. It is further useful, in various usage scenarios, to distinguish regions by relative temporal rates of change with respect to other regions, and/or with respect to the overall package encapsulated die. In some embodiments, in accordance with the first grid-topology aspect, the grid size is a function of the localized rates of change and the localized grid size is recomputed as the simulation progresses. More specifically, the grid spacing is adaptive such that the convex and concave regions of the thermally related distributions trend toward having finer grid spacing than the regions of near zero change and the inflection regions between convex and concave regions trend toward having still finer grid spacing than the convex and concave regions. An appropriately finer grain grid is used in thermally dynamic regions (such as regions proximate to fractionally large power sources, regions having power sources or sinks of complex shape and aspect ratio, and/or regions otherwise containing significant localized spatial variations in either heat generation or heat dissipation capacities, and regionalized using thermal time constants to enable efficient computation of full chip designs) while an appropriately coarser grain grid is used in regions of relative thermal calm/homogeneity, and heat flux. Stated differently, larger gradients, i.e., more rapid changes (in the thermally related distributions in space) directly result in finer splits (finer grid point spacing).

Local Grid Based on Design Characteristic Indexed Knowledge Base

As in any heuristic approach, there is no guarantee of good results, but in some usage scenarios, use of the second grid-topology aspect dramatically hastens convergence and improves computational efficiency. In accordance with the second aspect, grid boundaries are defined between IC materials having differing thermal conductance. Further in accordance with the second aspect, for at least portions of the simulation, the grid spacing is established based at least in part on anticipated optimal local spacing granularities.

The anticipated optimal local spacing granularities are determined with a variety of techniques, such as one or more of: a) variable grid knowledge and experience for common design scenarios gained from simulations using the first grid-topology aspect, b) predictions extrapolating from said knowledge and experience, and c) other techniques to determine efficient local spacing granularities. Stated differently, simulations based at least in part on the first aspect offer an opportunity to build knowledge and experience regarding the location, size, spacing, and density of heat sources and heat dissipaters, and boundaries between regions of differing thermal conductivity, in some usage scenarios, eventually drive the local grid to certain terminal (eventually stabilized) spacing granularities. In some embodiments, anticipated optimal local spacing granularities are compiled and/or predicted in conjunction with particular instances and combinations of one or more of the following design characteristics:

a) Power densities of devices and resistor elements in the interconnect;
b) Power source dimensions;
c) Shape factors of power sources;
d) Shape factors of conducting materials between power sources;
e) Dimensions of the materials (such as one or more of substrate, channel, dielectric, and other dimensionally-alterable materials) where power sources are embedded;
f) Distances of power sources from each other and the package boundaries;
g) Thermal conductivity differences between adjacent materials (such as one or more of dielectric, channel, substrate, package, metal, die-attach, C4 pads, bond wires, and other adjacent materials)
h) Thermal diffusivity of materials within the IC;
i) Estimated temperature gradients;
j) Computed temperature gradients (where the temperature distribution is known);
k) Area concentration of self heating sources (such as one or more of leakage, joule heating, and other heat sources);
l) Thermal conductivity of heat sinking materials (such as one or more of exposed pads within the package, and other heat-dissipating materials or structures); and
m) Thermal time constants (dependent on the specific heat and the thermal conductivity) of the materials within the die and the package.

In some usage scenarios, it is desirable for grid boundaries to coincide with known material boundaries, independent of grid size and iteration considerations. In some embodiments, grid boundaries are maintained throughout the simulation to be coincident to at least a selected plurality of the material boundaries.

Split Functions Overview

Special grid point location functions are used to define the magnitude and direction of the grid point spacing in 3D throughout the IC. Since the grid point location functions act to "split" the volume of the solution space, they are referred to herein as "split functions" or "splitting functions". The split functions are adapted to calculate the grid spacing distribution in iteration and 3D coordinate space. The various grid-topology aspects are carried out via the split functions. While in some embodiments any of the grid-topology aspects are used alone for the split functions, other embodiments selectively use more than one (or all of) the aspects. In some embodiments, the split functions are a component of a grid-based analysis control flow discussed in later paragraphs.

In some embodiments, the split functions are enabled to independently specify grid points locations (and thereby spacings) in the X, Y, and Z dimensions in accordance with arbitrary predetermined criteria (or split rules). In other embodiments, a different split rule is used in each dimension. In yet other embodiments, the same split rule governs the spacing in both the X and Y dimensions, and another split rule is used in the Z dimension.

A first exemplary split rule is "maintain an equal rate of variation (in one or more of the variables) over the intervals between grid points" (a.k.a. "equalize delta"). A second exemplary split rule is "between any two grid points keep the rate of variation (in one or more of the variables) below a predetermined maximum" (a.k.a. "bounded maximum delta"). A third exemplary split rule combines the previous two: "maintain the rate of variation (in one or more of the variables) below a predetermined maximum over the intervals between grid points" (a.k.a. "equalize and bound delta").

In some embodiments of the split functions, all of the grid-topology aspects, at least in part, influence the grid size for at least some iterations, but the extent the aspects influence the grid size is selectively varied across the iterations of the simulation in accordance with a predetermined criteria (or strategy). In a first split function example, during at least some iterations, information gained from the first grid-topology aspect is used to selectively qualify use of information based on the second grid-topology aspect. That is, during at least some iterations, the local grid sizing is at least in part generated through the use of local design characteristics and material boundary information that is enabled and/or weighted by the existence and/or relative intensity of local temperature gradients. In a second split function example, during at least some iterations, the local grid sizing is at least in part generated through use of local temperature gradient information to refine the grid sizing suggested by the use of a design characteristic knowledge base.

The split rules, in some embodiments, vary over the duration of the simulation. In some usage scenarios, it is advantageous to generate splits differently in different simulation phases.

Relationship of Split Functions to Design Assertions

In some embodiments directed to temperature assertion applications, split functions are temperature assertion aware, adapting the grid as required to be fine enough to insure a grid resolution capable of implementing the assertion. In a first illustrative example, if an assertion is made regarding a temperature relationship between two physical structures on the IC, then the split functions insure that the grid is fine enough to enable resolution of precise temperatures of the two structures. In an illustrative embodiment, the two structures are represented by two points and the split functions establish a grid spacing that is at least as small as the distance between the two points and thus the two points resolve to different temperatures. In a second illustrative example, if an assertion is made that: "point p is less than the maximum temperature Tmax", then the split functions establish a grid surrounding point p that is sufficiently fine to insure the assertion in view of the gradients in the surrounding area.

Grid-Based Analysis Inner-Loop Control Flow

An illustrative embodiment of a variable grid based technique, suitable for steady-state and/or transient temperature analysis, and making use of any combination of the grid-topology aspects, is diagrammed in FIG. 18 and is described as follows:

A) Establish (read or compute) thermal simulation initial conditions and control settings in the X, Y, and Z directions, including:
   A1) Establish initial power gradients;
   A2) Establish initial power source shape-based thermal gradients;
   A3) Establish initial temperature gradients (and/or thermal time constants); and
   A4) Establish initial split functions;

B) Using the split functions (of either A4 or C1b), compute the temperature distribution (and/or thermal time constants);

C) Proceed based on whether a predetermined inner loop criteria is met:
   C1) If the inner loop criteria is not met:
      b 1a) Using the temperature distribution (of B), compute the current power, thermal conductivity, and temperature gradients (and/or thermal time constants of the power sources and the material within the die);
      C1b) Compute split functions (using values updated in C1a, as required), and
      C1c) Iterate (by continuing at B); else
   C2) If the inner loop criteria is met, stop iterating and finish (by proceeding to D); and D) Using the (loop criteria satisfied) temperature distribution (of B), compute all steady-state final temperature dependent factors (and/or all transient intermediate temperature dependent factors), as desired.

Selected details of the actions of the foregoing embodiment are now described. The above functions A, B, C, C1a, C1b, and D, correspond respectively to functions 1820, 1830, 1840, 1850, 1860, and 1870, of FIG. 18. In some embodiments, in function A1 the establishment of the initial power gradients is based on the power density distribution (power divided by area) of the power per instance of active devices and the power density in resistor shapes.

In some embodiments, in function A2 the establishment of the initial thermal conductivity gradients is based on the ratios of the thermal conductivity of the materials constructing the IC. The ratios of thermal conductivity are usually the largest at the package-chip boundaries and in the Z direction (upwards and downward in the chip).

In some embodiments, in function A3 the establishment of the initial temperature gradients is based on a preselected initial temperature distribution model. In at least one preselected initial temperature distribution model, the temperature is constant throughout the IC. In another initial temperature distribution model, the temperature is the result from a previous simulation. In some usage scenarios, (such as when design variations are being evaluated), using the previous simulation result is beneficial. The design variations include one or more of: changing a power source, moving a component or structure, and other modifications to functional or physical factors.

In function C, the predetermined inner loop criteria is quite general. Exemplary loop criteria are evaluations of one or more of: run time, max delta (over all variables) between iterations is below a predetermined threshold, sum of all deltas (for all variables) between iterations is below a predetermined threshold, grid coarseness (reflecting that the split functions have been able to relax the grid resolution in view of simulation convergence of the gradients); and other loop exit criteria. In some embodiments, the simulation loops (iterates) or not based on whether the values of the temperature distribution (the temperature values) have stabilized within a predefined tolerance value since the previous computation. If stable temperatures are not present, then the iteration continues, otherwise the iteration completes. In steady-state analysis, the inner loop criteria is evaluated with respect to the steady-state temperature distribution. In transient analysis, the inner loop criteria is evaluated with respect to the transient temperature distribution.

In various embodiments, in functions C1a and D a wide variety of temperature dependent factors are optionally calculated, as desired, or as required by the goals and constraints of a particular usage scenario. Temperature dependent factors calculated in the C1a and D functions optionally are one or more of: power and thermal conductivity distributions; power, thermal conductivity, and temperature gradients; and other temperature dependent parameters and values. In some usage scenarios, simulation convergence is affected by temperature dependence on the other factors.

Simulation Loop Hierarchy

Figure 18:
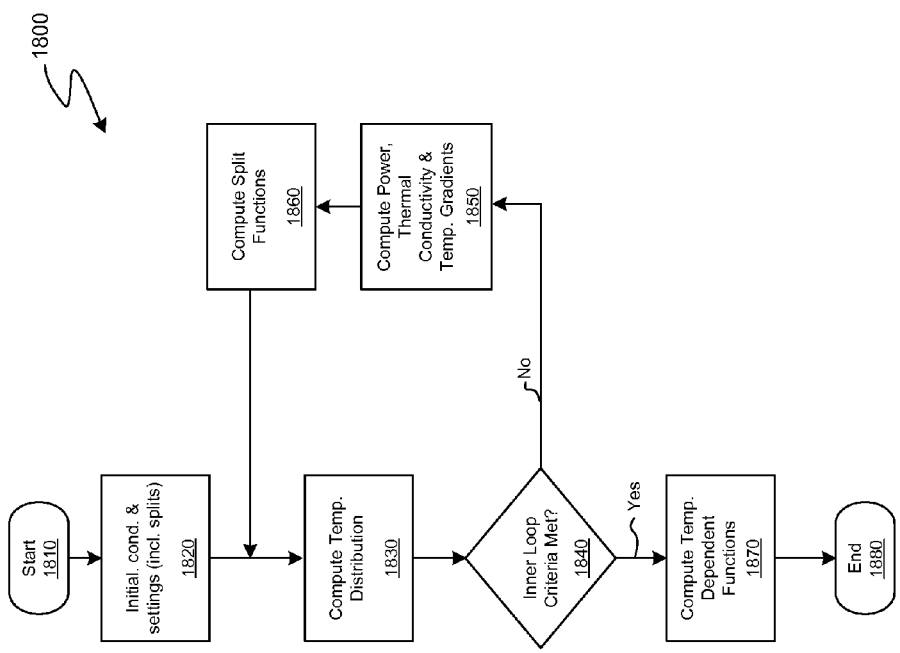
FIG. 18 illustrates an embodiment of an abstract inner loop control flow for variable-grid-based analysis.
Figure 19:
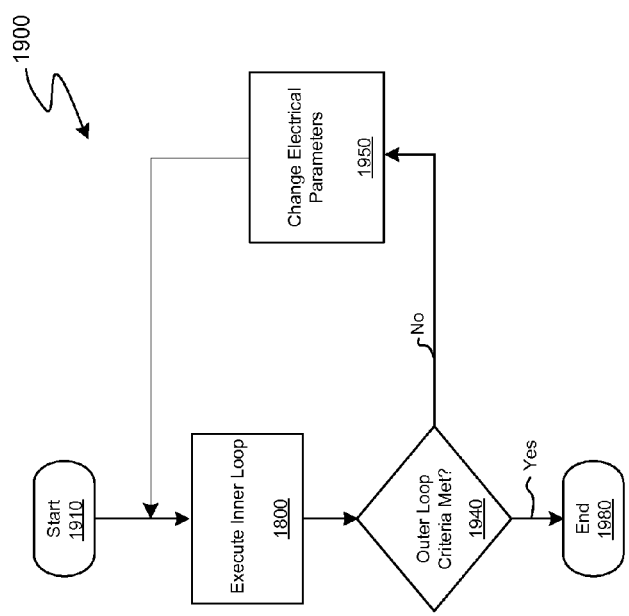
FIG. 19 illustrates an embodiment of an abstract electro-thermal outer loop control flow for variable-grid-based analysis.

While the control flow of FIG. 18 is usable alone, the flow is also used as the "inner loop" 1800 within the electro-thermal "outer-loop" control flow 1900 of FIG. 19. In some usage scenarios and/or embodiments, the inner loop criteria evaluates simulation (meta-)behavior and/or characteristics, while the outer loop criteria evaluates design behavior and/or characteristics (as determined by the simulation).

In steady-state analysis for example, the inner loop provides simulation results for one configuration of electrical parameters (broadly, all aspects of design, design variables, and/or material characteristics). The inner loop analysis is then repeated as required in accordance with a predetermined design automation strategy/algorithm that in the abstract is implemented by changing the electrical parameters (at function 1950) as a function of the results of inner loop 1800 and conditional on the evaluation of an outer loop criteria (at function 1940). In a first example, the outer loop is used to sequence through a succession of design variations for subsequent evaluation of which particular variation represented the optimal design for a given set of design requirements. (The sequence optionally exits early if an optimal design is recognizable during the sequencing.) In a second example, the outer loop supports one or more design assertions. In some instances of the second example, the design assertions are supported by tracking one or more error terms related to the assertion(s) and dynamically changing the electrical parameters to drive the error terms toward zero until the assertion(s) is(are) met.

In a transient analysis example, the outer loop criteria evaluates (at function 1940) for electrical failure conditions that are possibly present at intermediate states in the analysis. The safe/failure conditions are a function of library element characteristics. For example, a failure is indicated upon detection that an element self-heated in excess of a predefined safe power range. In another example, a failure is indicated upon detection that an aggressor device heated a victim device outside a predefined safe temperature range. If any failure conditions are detected, then the electrical parameters are changed (at function 1950), and the inner loop 1800 re-executed as required, until the outer loop criteria 1940 establishes that the electrical conditions (corresponding to the most recent inner loop iteration) are safe for the design.

Split Function Variation in Different Simulation Phases

With respect to some embodiments, it is useful to conceptualize multiple simulation phases (or regimes) with respect to split function operation. The phases are herein defined as: "coarse grid", "simplified grid", and "detailed variable grid" phases. As is described below, use of one or more of the phases varies by embodiment. Conceptually, the use of multiple phases in an embodiment is construed as a variation of the third grid-topology aspect. Split function operation in the detailed variable grid phase is, in some embodiments, as previously overviewed.

Split function operation in the coarse grid phase is characterized by operation with a relatively coarse grid during the interval from simulation start through initial convergence. The relatively coarse grid is intended to achieve convergence quickly albeit at relaxed accuracy and is followed by one or more subsequent phases that implement a relatively finer grid to refine the simulation accuracy. Thus, the overall simulation more efficiently uses the available computational resources. The relatively coarse grid is determined via any number of techniques. In some embodiments, the relatively coarser grid of the coarse grid phase is achieved by using a selected fraction of the design characteristics information available for the design being simulated. In other embodiments, an intermediate grid is computed first using any of the approaches described herein for use in the other phases and then the grid scaled up by a predetermined factor to a coarser resolution.

Split function operation in the simplified grid phase is in some way simplified relative to that of detailed variable grid operation. In some embodiments, a global (iso-spaced) split function is at least sometimes used within a simplified grid phase. In some usage scenarios, the global (iso-spaced) grid is computationally easier to establish than a localized (variably-spaced) grid. However, in some usage scenarios, global grids are computationally inefficient. A different approach to split function operation in the simplified grid phase is discussed below, as is an example simplified global split function.

Various embodiments are contemplated, such as a) an embodiment operating in the detailed variable grid phase; b) an embodiment operating first in the simplified grid phase and subsequently in the detailed variable grid phase; c) an embodiment operating first in the initial convergence phase and subsequently in the detailed variable grid phase; d) an embodiment operating first in the initial convergence phase, then the simplified grid phase, and finally the detailed variable grid phase; e) an embodiment operating first using a previous simulation result and subsequently in the detailed variable grid phase; and f) other embodiments operating in various grid configurations during various phases. In some usage scenarios, some of the foregoing embodiments have applicability in evaluating a succession of design variations (such as embodiments operating first using a previous simulation result and subsequently using a detailed variable grid phase).

Runtime Choice of Simplified Grid Split Functions

In the different approach to simplified grid phase embodiments, a runtime choice is made between use of a simplified global split function or a simplified localized split function. In some embodiments, the runtime choice is dependent on the die area and the ratio of the die area of the individual power sources.

If the die area is large or the die area is consumed by fractionally large power sources (such as designs having power transistors with hundreds of fingers), the simplified localized split function is used. The simplified localized split function generates a localized grid based on a simplified set of considerations. Example simplified sets of considerations include one or more of: the fractional contribution of localized power source areas to the total die size area, the existence of local power source shapes other than rectilinear or 45 degrees, the local gradient values of the power density and thermal conductivity, and other relatively low complexity criteria. That is, for at least some iterations, the granularity of the grid spacing is adaptively locally reduced (the grid spacing is made finer) as a function of proximity to significant heat sources, complex shapes, and regions of rapid change in either heat generation or heat dissipation.

If the die area is small and the individual power sources are a small fraction of the die area, (such as some usage scenarios of standard-cell based designs) the simplified global grid split function is used. The chosen grid spacing, in some usage scenarios, is unnecessarily fine for much of the IC, but since the die area is small, the initial computational inefficiency of the overly fine global grid is tolerated in exchange for reduced computational requirements relative to a localized grid. The simplified global split function generates a global grid based on a simplified set of considerations. Example simplified sets of considerations include one or more of: maximum gradients of power density and thermal conductivity of the IC, die area of the IC, the area and shape of power sources, and other relatively low complexity criteria. That is, for at least some iterations, the grid spacing is set everywhere fine enough to handle the regions of worst case change in either heat generation or dissipation.

In various embodiments, one or more of the adaptive 3D grid analysis techniques are used in performing one or more of the design repair and/or improvement techniques.

Thermal Analysis Shell

Figure 20:
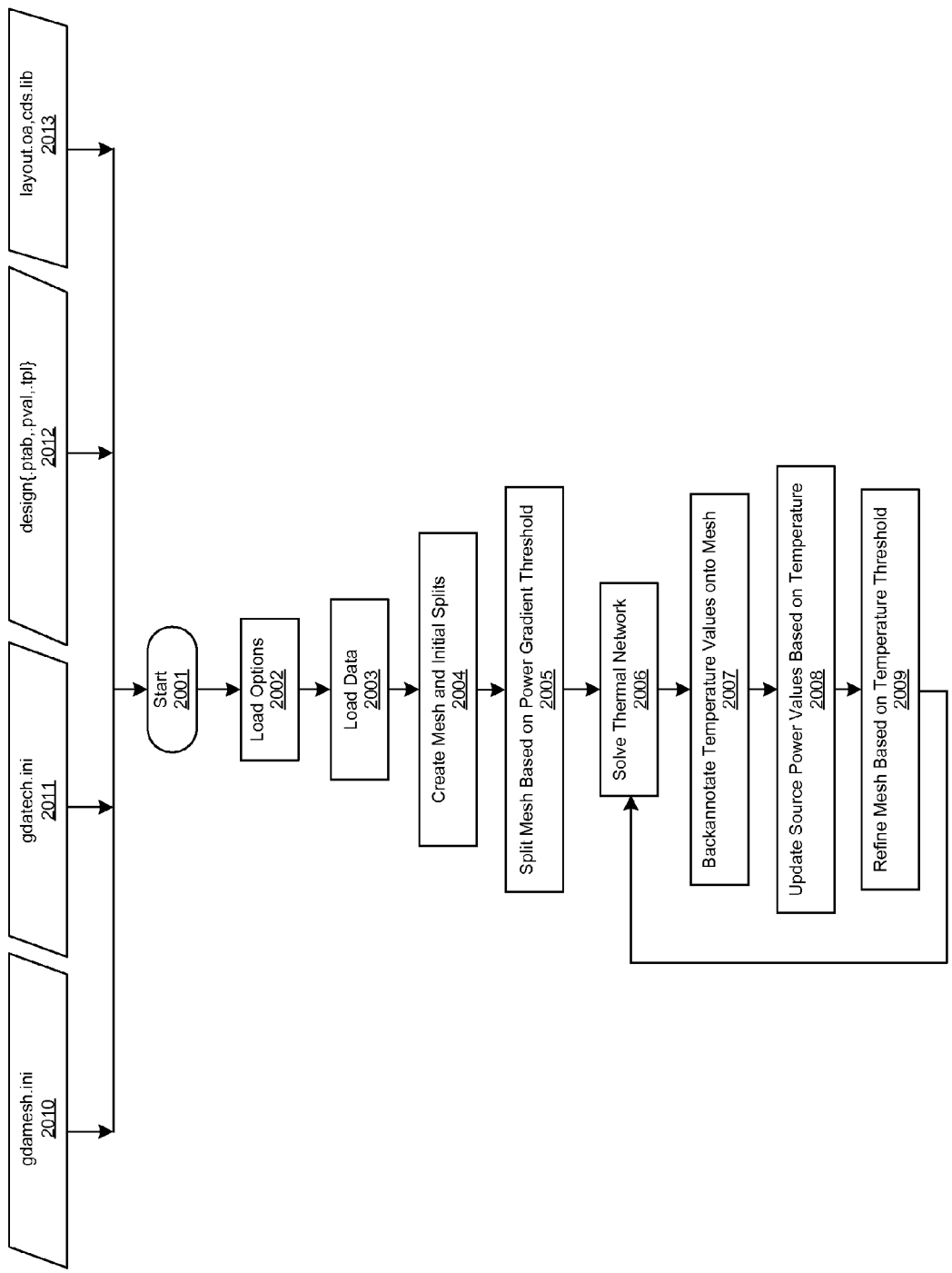
FIG. 20 illustrates a flow diagram of an embodiment of a thermal analysis shell.

FIG. 20 illustrates a flow diagram of an embodiment of a thermal analysis shell. In some embodiments, the analysis shell uses one or more of the techniques described with respect to FIG. 18 and FIG. 19, as well as described in the "Adaptive 3D Grid Analysis", the "Stead-State and Transient Analysis Strategies", the "Thermal Time Constants for Transient Analysis", the "Local Grid Based on Thermally Related Distributions", the "Local Grid Based on Design Characteristic Indexed Knowledge Base", the "Split Functions Overview", the "Relationship of Split Functions to Design Assertions", the "Split Function Variation in Different Simulation Phases", and the "Runtime Choice of Simplified Grid Split Functions" sections located elsewhere herein. In some embodiments, the analysis shell is part of Thermal-Aware Design Automation suite 200 of FIGS. 4A and 4B. The shell provides 3D thermal extraction and analysis by computing a temperature distribution given a power distribution, material extents, and thermal properties of mask layers and packaging of an IC. In some usage scenarios, information produced by the shell enables designers to better address various design tasks, such as package selection/design, reliability prediction/improvement, and performance estimation.

More specifically, the shell is invoked ("Start" 2001), and proceeds to read settings relating to analysis ("Load Options" 2002). The settings include a specification of an arbitrary mesh ("gdamesh.ini" 2010) that enables control of spatial resolution of a temperature solution (such as the temperature distribution) of a design under test (such as a target of the 3D thermal analysis). The shell then reads data specific to technology associated with the design, as well as data specific to the design proper ("Load Data" 2003). The data includes technology information including a description of physical properties of the design being analyzed (such as physical properties of an IC die and a package associated with the IC) and properties of an environment of a context of the analysis ("gdatech.ini" 2011). The data further includes design-specific information including a listing of power sources of the design, and optionally one or more areas of interest to focus the analysis on ("design.ptab" with respect to 2012). The design-specific information further includes a specification of initial power values associated with the power sources ("design.pval" with respect to 2012). The design-specific information further includes a table of temperature versus power for each source, enabling table lookup models for temperature-dependent power estimation ("design.tpl" with respect to 2012). The design-specific information optionally further includes a binary file having layout information ("layout.oa" with respect to 2013) and a specification of a library location within a file hierarchy ("cds.lib" with respect to 2013). In some embodiments, the layout information is in a format compatible with an open access (e.g. industry standard "OpenAccess") file format.

Flow then proceeds to define one or more meshes ("Create Mesh and Initial Splits" 2004 and "Split Mesh Based on Power Gradient Threshold" 2005) in accordance with power gradients and power gradient thresholds. Flow then proceeds to an iteration beginning with determining a solution to a thermal network representative of the design ("Solve Thermal Network" 2006). The iteration continues by updating temperatures of the solution onto the mesh ("Backannotate Temperature Values onto Mesh" 2007). The iteration further continues with revising respective power values based on the temperatures ("Update Source Power Values Based on Temperature" 2008). The iteration further continues with determining one or more new mesh granularities based on the temperatures and a temperature threshold ("Refine Mesh Based on Temperature Threshold" 2009). The iteration loop is then complete, and flow continues to repeat the iteration, beginning with "Solve Thermal Network" 2006.

In some embodiments, the iteration is exited based on one or more design-specific and/or analysis-specific criteria. In some embodiments, the iteration is exited based on one or more outer loop criteria (such as the outer loop criteria described in conjunction with function 1940 of FIG. 19).

In some embodiments, the analysis displays results in a GUI window (such as a Qt-based window). In some embodiments, an initial window displays a 2D layout of the power sources at a specific layer. Temperatures on different layers are viewable by using a GUI input (such as a graphical slider or a mouse wheel). In various embodiments, various result displays include one or more of: a 3D temperature display, a 3D temperature gradient display, a 3D display of a temperature gradient magnitude in a single dimension (such as X or Y dimensions), a 3D power display, and other displays of other results and inputs. In some embodiments, the mesh and/or quantization associated with the analysis are optionally displayable in conjunction with the displays of the results.

In some embodiments, the GUI window accepts one or more commands, such as one or more of the following: a command to refine the mesh (such as operations similar to all or portions of one or more of "Split Mesh Based on Power Gradient Threshold" 2005 and "Refine Mesh Based on Temperature Threshold" 2009), a command to perform a loop through a simulator (such as an iteration from "Solve Thermal Network" 2006 through "Refine Mesh Based on Temperature Threshold" 2009), and other commands to analyze or modify analysis of the design.

In some embodiments, the analysis generates a text file with a listing of all power sources, respective temperatures associated with each power source, and respective final power values used to calculate each respective temperature. In some embodiments, the analysis generates a text file of a listing of all layout polygons with respective mask layer and respective coordinates, along with respective temperatures for each of the polygons.

Mesh Initialization File

In some embodiments, a mesh initialization file (a.k.a. meshfile, such as "gdamesh.ini" 2010 of FIG. 20) enables a user to control discretization, and consequently, spatial resolution of a temperature solution of a physical volume (such as a control volume) being analyzed. The meshfile provides for specifying various parameters according to various embodiments, including one or more of: an initial seed, a reseed count, a reseed alpha parameter, a refine count, a refine alpha parameter, a refine beta parameter, a simulate count, and a model type parameter. The initial seed is a positive, non-zero integer-valued parameter that specifies an initial discretization across a surface of the control volume, resulting in a particular number of uniformly spaced control elements along X and Y axes, the particular number being two raised to the initial seed power. Thus the initial spatial resolution of the solution is determined. In some embodiments, the resolution is identical across all layers of the design.

Figure 21:
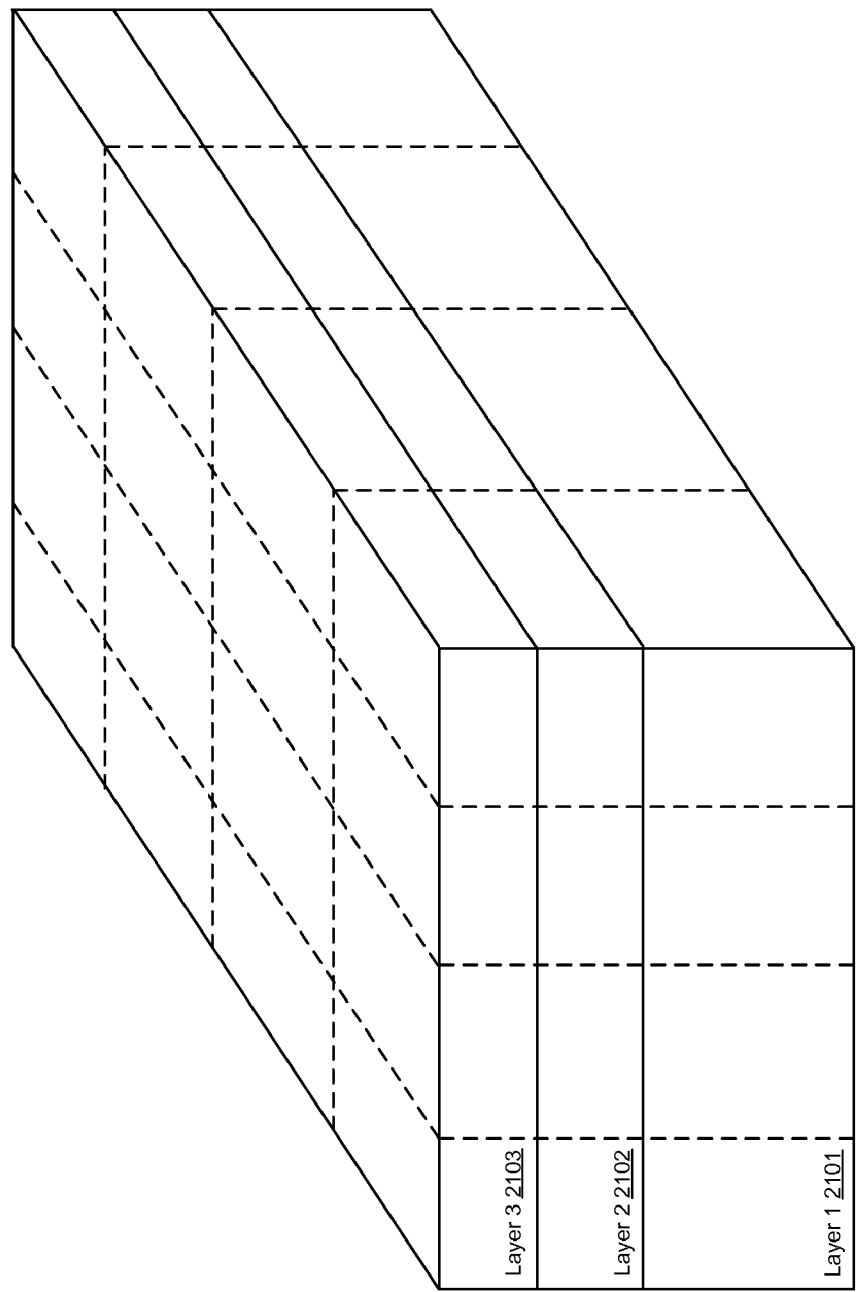
FIG. 21 illustrates an example control volume in accordance with an initial seed of two.

FIG. 21 illustrates an example control volume in accordance with an initial seed of two. Four (two raised to the second power) control volumes in each of the X and the Y axes are present, in each of three layers stacked in the Z axis ("Layer 1" 2101, "Layer 2" 2102, and "Layer 3" 2103).

The reseed count is a positive integer-valued parameter that specifies a number of times (such as iterations) the discretization is refined to improve spatial resolution of the solution before any temperature is calculated. At each iteration, and for each control element, values of the power gradients (with respect to neighbors in the X and the Y axes) are checked. If one of the values exceeds a threshold, then the element is halved in the respective direction. The reseed alpha parameter is a real number that specifies the threshold. Note that the refinement of the discretization before temperature calculation is a first phase of adaptive mesh generation, and is directed to improve resolution of the temperature solution where power gradients are high. Subsequent phases of the adaptive mesh generation are driven by other parameters, described elsewhere herein.

The refine count is a positive integer-valued parameter that specifies a number of times (such as iterations) the discretization is refined, to improve spatial resolution of the temperature solution. Refinement iterations are performed after at least one solution of discretized volume, such as when at least one estimation of mesh temperatures is available. During each refinement iteration, values of temperature gradients across the control element (such as between the center of the element and each face in the X and the Y axes) is checked. If the value is greater than a threshold, then a number of divisions (such as of the control volume) is determined as the square root of one plus a calculation. The calculation is the refine beta parameter (specified as a real number) multiplied by the value of the temperature gradient. The refine alpha parameter is a real number specifying the threshold.

The simulate count is a positive integer-valued number that specifies a number of updates of the power source values, the updates being based on temperature as determined by the analysis. After each update iteration, the temperatures of mesh vertices are recalculated, and the power source values are updated in accordance with the recalculated temperatures. In some usage scenarios, convergence to a steady-state condition occurs unless a run-away condition is present in the design.

The model type parameter specifies a thermal model level for the analysis. Increasing levels, starting with zero, specify improved accuracy. In some usage scenarios and/or embodiments, improved accuracy modeling uses correspondingly more computational resources.

CONCLUSION

Certain choices have been made in the presentation of this disclosure merely for reasons of convenience in preparing the text and drawings and unless there is an indication to the contrary these choices of convenience should not be construed per se as conveying additional information regarding the structure of the embodiments illustrated. Illustrative examples of such choices of convenience include: the particular organization or assignment of the designations used for the figure numbering and the particular organization or assignment of the element identifiers (i.e., the callouts or numerical designators) used to identify and reference the features and elements of the embodiments.

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the descriptions and within the scope of the claims of the issued patent. For example, interconnect and function-unit bit-widths, clock speeds, and the type of technology used may generally be varied in each component block. The names given to interconnect and logic are merely illustrative, and should not be construed as limiting the concepts described. The order and arrangement of flowchart and flow diagram process, action, and function elements may generally be varied. Also, unless specifically stated to the contrary, the value ranges specified, the maximum and minimum values used, or other particular specifications (such as the design file formats, the type of packaging, the number of metal layers, and the type and number of stages in the design flow), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (facilitating migration of functions previously in hardware into software) and higher integration density (facilitating migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been illustrated with detail and environmental context well beyond that required for a minimal implementation of many of aspects of the concepts described. Those of ordinary skill in the art will recognize that variations may omit disclosed components or features without altering the basic cooperation among the remaining elements. It is thus understood that much of the details disclosed are not required to implement various aspects of the concepts described. To the extent that the remaining elements are distinguishable from the prior art, components and features that may be so omitted are not limiting on the concepts described herein.

All such variations in design comprise insubstantial changes over the descriptions conveyed by the illustrative embodiments. It is also understood that the concepts described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method of computer-aided-design of integrated circuits, the method comprising:
    manipulating a design database representing at least a portion of a chip having an associated physical structure, operational temperature distribution, and operational electrical performance;
    simulating the operational temperature distribution of at least part of the chip using thermal modeling of thermally significant features of the physical structure, the thermally significant features comprising active devices and interconnect of a die and being described by the design database;
    based at least in part on the simulating, selectively modifying aspects of the design database in accordance with at least one predetermined criteria;
    wherein the manipulating, the simulating, and the selectively modifying are at least in part via at least one processor; and
    wherein the simulating is in accordance with a model of the chip that is in accordance with the design database and using grid points of a grid in three coordinate dimensions, and spacing of the grid is locally variable.

2. The method of claim 1, further comprising:
    simulating the operational electrical performance of the at least part of the chip;
    programmatically communicating information between the acts of simulating;
    wherein the simulating the operational electrical performance and the programmatically communicating are at least in part via the at least one processor; and
    wherein the selectively modifying is further based on the simulating of the operational electrical performance 3. The method of claim 1, wherein the selectively modifying is directed to alter the operational temperature distribution.

4. The method of claim 1, wherein the selectively modifying is directed to enhance cooling capability proximate to at least one hot region of the chip.

5. The method of claim 1, wherein the selectively modifying is directed to equalize temperature in at least one region of the chip by raising temperature within at least part of the at least one region.

6. The method of claim 1, wherein the selectively modifying is directed to improve one or more of:
the operational temperature distribution;
chip performance;
static power;
dynamic power;
maximum temperature;
leakage; and
chip reliability.

7. The method of claim 1, wherein the selectively modifying comprises making one or more changes to one or more of:
a heat generating element;
a heat conducting element; and
a heat dissipating element.

8. The method of claim 1, wherein the selectively modifying comprises making one or more changes to one or more of:
a bond-wire land;
a solder-bump pad;
a via;
a stacked via;
a via placed to be thermally significant and electrically inconsequential;
a via coupled to a bond-wire land site;
a via coupled to a solder-bump pad; and
an area of metallization.

9. The method of claim 1, wherein the selectively modifying comprises a change to one or more of density and location of a metal fill.

10. The method of claim 1, wherein the selectively modifying comprises a change relating to one or more solder bumps.

11. The method of claim 1, wherein the selectively modifying comprises a change relating to one or more metal attachment pads.

12. The method of claim 1, wherein the acts of simulating and selectively modifying are actions performed in a thermal and electrical analysis and improvement computer aided design tool adapted to function independently of other computer aided design tools.

13. The method of claim 12, wherein at least one of the other computer aided design tools is a circuit simulator.

14. The method of claim 12, wherein at least one of the other computer aided design tools is a timing analyzer.

15. The method of claim 1, wherein at least the simulating is performed by a thermal analysis computer aided design sub-system adapted to interact with at least one other computer aided design sub-system in at least a circuit simulation stage and a floorplanning stage of an overall design flow.

16. The method of claim 1, wherein the predetermined criteria comprises one or more of:
reducing temperature in one or more predefined regions;
increasing temperature in one or more predefined regions;
equalizing temperature between predefined regions;
bringing one or more operating parameters within predetermined limits;
satisfying one or more predefined assertions; and
reducing likelihood of electromigration induced failure.

17. The method of claim 1, wherein the design database is adapted to a fabrication process having at least one process step that permits at least some regions on at least one layer to be a selected one of a plurality of metallization types having respectively different elemental compositions and at least one of the metallization types has enhanced thermal conductivity.

18. The method of claim 1, wherein the design database is adapted to a fabrication process having at least one process step that permits at least some regions on at least one layer to be a selected one of a plurality of metallization types having respectively different elemental compositions and at least one of the metallization types is available for fabricating vias through at least one predetermined dielectric layer.

19. A system for the computer-aided-design of integrated circuits, the system comprising:
a computing platform including processor, memory, and I/O;
a physical design sub-system adapted to manipulate a design database representing at least a portion of a chip having an associated physical structure, operational temperature distribution, and operational electrical performance;
a thermal analysis sub-system adapted to simulate the operational temperature distribution of at least part of the chip using thermal modeling of thermally significant features of the physical structure, the thermally significant features comprising active devices and interconnect of a die and being described by the design database;
a thermal improvement sub-system adapted to selectively modify aspects of the design database based at least in part on the simulated operational temperature distribution and in accordance with at least one predetermined criteria; and
wherein the simulation is in accordance with a model of the chip that is in accordance with the design database and using grid points of a grid in three coordinate dimensions, and spacing of the grid is locally variable.

20. The system of claim 19, further comprising an electrical analysis subsystem adapted to simulate the operational electrical performance of the at least part of the chip.

21. The system of claim 20, further comprising an analysis communication subsystem adapted to programmatically communicate information between the thermal and the electrical analysis subsystems.

22. The system of claim 19, wherein the selectively modifying is directed to alter the operational temperature distribution.

23. The system of claim 19, wherein the selectively modifying is directed to enhance cooling capability proximate to at least one hot region of the chip.

24. The system of claim 19, wherein the selectively modifying is directed to equalize temperature in at least one region of the chip by raising temperature within at least part of the at least one region.

25. The system of claim 19, wherein the selectively modifying is directed to improve one or more of:
the operational temperature distribution;
chip performance;
static power;
dynamic power;
maximum temperature;
leakage; and
chip reliability.

26. The system of claim 19, wherein the selectively modifying comprises making one or more changes to one or more of:
a heat generating element;
a heat conducting element; and
a heat dissipating element.

27. The system of claim 19, wherein the selectively modifying comprises making one or more changes to one or more of:
- a bond-wire land;
- a solder-bump pad;
- a via;
- a stacked via;
- a via placed to be thermally significant and electrically inconsequential;
- a via coupled to a bond-wire land site;
- a via coupled to a solder-bump pad; and
- an area of metallization.

28. The system of claim 19, wherein the predetermined criteria comprises one or more of:
- reducing temperature in one or more predefined regions;
- increasing temperature in one or more predefined regions;
- equalizing temperature between predefined regions;
- bringing one or more operating parameters within predetermined limits;
- satisfying one or more predefined assertions; and
- reducing likelihood of electromigration induced failure.

29. The system of claim 19, wherein the design database is adapted to a fabrication process having at least one process step that permits at least some regions on at least one layer to be a selected one of a plurality of metallization types having respectively different elemental compositions and at least one of the metallization types has enhanced thermal conductivity.

30. The system of claim 19, wherein the design database is adapted to a fabrication process having at least one process step that permits at least some regions on at least one layer to be a selected one of a plurality of metallization types having respectively different elemental compositions and at least one of the metallization types is available for fabricating vias through at least one predetermined dielectric layer.

31. An article of manufacture comprising a computer readable medium having stored therein a computer program component adapted to semiconductor computer-aided-design, the computer program component comprising:
- functions that when executed on a computer are adapted to manipulate a design database representing at least a portion of a chip having an associated physical structure, operational temperature distribution, and operational electrical performance;
- functions that when executed on the computer are adapted to simulate the operational temperature distribution of at least part of the chip using thermal modeling of thermally significant features of the physical structure, the thermally significant features comprising active devices and interconnect of a die and being described by the design database;
- functions that when executed on the computer are adapted to selectively modify aspects of the design database based at least in part on the simulated operational temperature distribution and in accordance with at least one predetermined criteria; and
- wherein the simulation is in accordance with a model of the chip that is in accordance with the design database and using grid points of a grid in three coordinate dimensions, and spacing of the grid is locally variable.

32. The article of manufacture of claim 31, wherein the computer program component further comprises functions that when executed on the computer are adapted to simulate the operational electrical performance of the at least part of the chip.

33. The article of manufacture of claim 32, wherein the computer program component further comprises functions that when executed on the computer are adapted to programmatically communicate information between the simulation of the operational temperature distribution and the simulation of the operational electrical performance 34. The article of manufacture of claim 31, wherein the selectively modifying is directed to alter the operational temperature distribution.

35. The article of manufacture of claim 31, wherein the selectively modifying is directed to enhance cooling capability proximate to at least one hot region of the chip.

36. The article of manufacture of claim 31, wherein the selectively modifying is directed to equalize temperature in at least one region of the chip by raising temperature within at least part of the at least one region.

37. The article of manufacture of claim 31, wherein the selectively modifying is directed to improve one or more of:
- the operational temperature distribution;
- chip performance;
- static power;
- dynamic power;
- maximum temperature;
- leakage; and
- chip reliability.

38. The article of manufacture of claim 31, wherein the selectively modifying comprises making one or more changes to one or more of:
- a heat generating element;
- a heat conducting element; and
- a heat dissipating element.

39. The article of manufacture of claim 31, wherein the selectively modifying comprises making one or more changes to one or more of:
- chip partitioning;
- chip floorplanning;
- chip place and route;
- chip interconnect;
- chip metallization;
- chip vias between interconnect layers;
- power distribution;
- clock distribution;
- I/O pad locations;
- die-to-package attachment;
- package design; and
- heat dissipater design.

40. The article of manufacture of claim 31, wherein the predetermined criteria comprises one or more of:
- reducing temperature in one or more predefined regions;
- increasing temperature in one or more predefined regions;
- equalizing temperature between predefined regions;
- bringing one or more operating parameters within predetermined limits;
- satisfying one or more predefined assertions; and
- reducing likelihood of electromigration induced failure.

41. The article of manufacture of claim 31, wherein the design database is adapted to a fabrication process having at least one process step that permits at least some regions on at least one layer to be a selected one of a plurality of metallization types having respectively different elemental compositions and at least one of the metallization types has enhanced thermal conductivity.

42. The article of manufacture of claim 31, wherein the design database is adapted to a fabrication process having at least one process step that permits at least some regions on at least one layer to be a selected one of a plurality of metallization types having respectively different elemental compositions and at least one of the metallization types is available for fabricating vias through at least one predetermined dielectric layer.

43. A system for computer-aided-design of integrated circuits, the system comprising:
- means for manipulating a design database representing at least a portion of a chip having an associated physical structure, operational temperature distribution, and operational electrical performance;
- means for simulating the operational temperature distribution of at least part of the chip using thermal modeling of thermally significant features of the physical structure, the thermally significant features comprising active devices and interconnect of a die and being described by the design database;
- means for selectively modifying aspects of the design database in accordance with at least one predetermined criteria and based at least in part on some results of the means for simulating; and
- wherein the means for simulating is in accordance with a model of the chip that is in accordance with the design database and using grid points of a grid in three coordinate dimensions, and spacing of the grid is locally variable.

44. The system of claim 43, further comprising:
- means for simulating the operational electrical performance of the at least part of the chip;
- means for programmatically communicating information between the means for simulating the operational temperature distribution and the means for simulating the operational electrical performance; and
- wherein the means for selectively modifying is further based on at least some results of the means for simulating of the operational electrical performance.

* * * * *